US009162542B2

(12) United States Patent
Shima et al.

(10) Patent No.: US 9,162,542 B2
(45) Date of Patent: Oct. 20, 2015

(54) TIRE AIR PRESSURE TRANSMISSION DEVICE AND TIRE AIR PRESSURE MONITOR SYSTEM

(75) Inventors: Takashi Shima, Milton Keynes (GB); Kazuo Sakaguchi, Ebina (JP); Syoji Terada, Hiratsuka (JP)

(73) Assignee: NISSAN MOTOR CO., LTD., Yokohama-shi, Kanagawa (JP)

( * ) Notice: Subject to any disclaimer, the term of this patent is extended or adjusted under 35 U.S.C. 154(b) by 246 days.

(21) Appl. No.: 14/113,437

(22) PCT Filed: Feb. 20, 2012

(86) PCT No.: PCT/JP2012/053973
§ 371 (c)(1),
(2), (4) Date: Nov. 18, 2013

(87) PCT Pub. No.: WO2012/147396
PCT Pub. Date: Nov. 1, 2012

(65) Prior Publication Data
US 2014/0167950 A1  Jun. 19, 2014

(30) Foreign Application Priority Data

Apr. 25, 2011 (JP) ................................. 2011-096948
Apr. 25, 2011 (JP) ................................. 2011-096949

(51) Int. Cl.
*B60C 23/04* (2006.01)
*G01L 17/00* (2006.01)

(52) U.S. Cl.
CPC ......... *B60C 23/0447* (2013.01); *B60C 23/0416* (2013.01); *B60C 23/0488* (2013.01); *B60C 23/0489* (2013.01); *G01L 17/005* (2013.01)

(58) Field of Classification Search
CPC ............ B60C 23/0447; B60C 23/0416; B60C 23/0488; B60C 23/0489; G01L 17/005
USPC .......................... 340/442, 445–448; 73/146.5
See application file for complete search history.

(56) References Cited

U.S. PATENT DOCUMENTS

| | | | |
|---|---|---|---|
| 6,112,587 A | 9/2000 | Oldenettel | |
| 7,800,487 B2 * | 9/2010 | Miyamoto | 340/442 |
| 8,279,056 B2 * | 10/2012 | Fujita et al. | 340/444 |
| 8,471,695 B2 | 6/2013 | Maekawa et al. | |
| 8,565,967 B2 * | 10/2013 | Steiner | 701/34.4 |
| 8,978,460 B2 * | 3/2015 | Kretschmann | 73/146.5 |
| 2004/0246115 A1 | 12/2004 | Ogawa | |
| 2005/0156722 A1 | 7/2005 | McCall et al. | |
| 2005/0248446 A1 * | 11/2005 | Watabe et al. | 340/442 |
| 2005/0253696 A1 * | 11/2005 | Mori et al. | 340/445 |
| 2008/0055059 A1 * | 3/2008 | Murakami | 340/442 |
| 2009/0043517 A1 * | 2/2009 | Matsuda et al. | 702/41 |
| 2010/0294032 A1 | 11/2010 | Pannek et al. | |

FOREIGN PATENT DOCUMENTS

| | | | |
|---|---|---|---|
| JP | 2004-345550 A | 12/2004 | |
| JP | 2007-522987 A | 8/2007 | |
| JP | 2010-122023 A | 6/2010 | |
| JP | 2010-536638 A | 12/2010 | |
| JP | 2012-030739 A | 2/2012 | |

* cited by examiner

*Primary Examiner* — Daniel Wu
(74) *Attorney, Agent, or Firm* — Young Basile

(57) ABSTRACT

A tire air pressure transmission device is provided that is configured to set a sampling period or cycle based on a centrifugal acceleration of a wheel in the centrifugal direction, and to detect the value of the gravitational acceleration component of the centrifugal acceleration at each set sampling period.

18 Claims, 15 Drawing Sheets

WHEEL SPEED

TIME

CENTRIFUGAL ACCELERATION (G)

TIME

GRAVITATIONAL ACCELERATION COMPONENT [G]

TIME

CENTRIFUGAL COMPONENT [G]

TIME

S1: Input TPMS data

S2: Calculate rotational position

S3: Calculate dispersion characteristic value

S4: TPMS data received 10 times or more?

S5: Maximum value >0.57 AND Other values <0.37 ?

S6: Determine wheel position

S7: Cumulative travel time elapsed 8 min.?

NUMBER OF TEETH

NUMBER OF TEETH

NUMBER OF TEETH

NUMBER OF TEETH

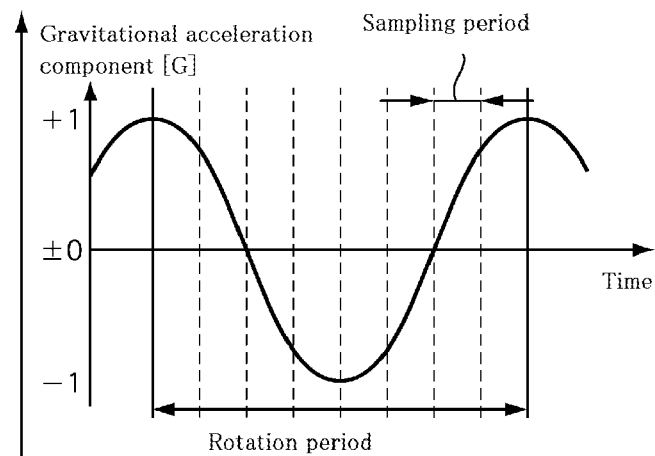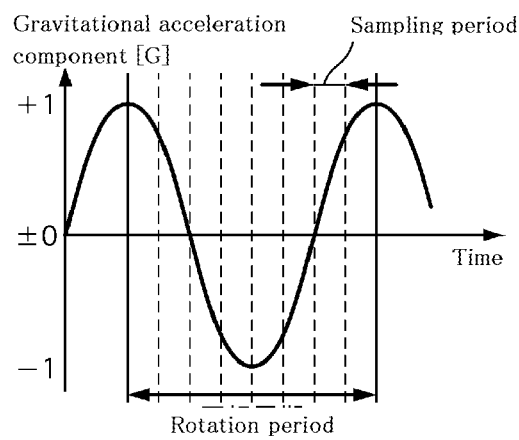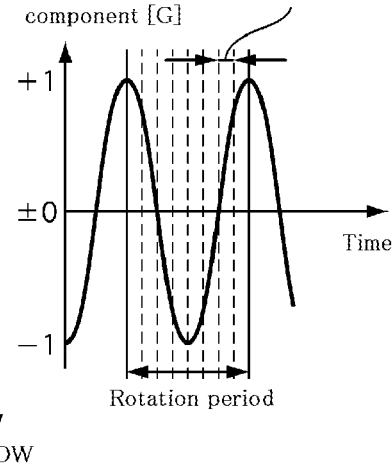
FIG. 17

TIRE AIR PRESSURE TRANSMISSION DEVICE AND TIRE AIR PRESSURE MONITOR SYSTEM

CROSS-REFERENCE TO RELATED APPLICATIONS

This national stage application claims priority to Japanese Patent Application No. 2011-096949 filed on Apr. 25, 2011, and claims priority to Japanese Patent Application No. 2011-096948 filed on Apr. 25, 2011, both of which are incorporated herein in their entirety.

TECHNICAL FIELD

The present invention relates in general to a tire air pressure transmission device and a tire air pressure monitoring system.

BACKGROUND

Conventionally, in a tire air or pneumatic pressure monitoring device such as that described in Japanese Patent Application Publication No. 2010-122023, by transmitting tire pressure monitoring system (TPMS) data at a timing at which an acceleration in a rotational direction of a TPMS sensor installed on each wheel reaches 1 [G] or "−1" [G], a TPMS sensor transmits the TPMS data at a constant rotational position of a wheel. A TPMS control unit installed on a side of a vehicle body determines a wheel position of the TPMS sensor based on the number of teeth that are acquired from a chain of wheel speed pulses detected by a wheel speed sensor at a timing at which the TPMS data has been received.

According to the prior art described above, however, although it is necessary to detect an acceleration in a rotating direction at a predetermined sampling cycle or period, when this sampling period is short, the power consumption of the TPMS sensor will be larger and the long life of the TPMS sensor battery will not be secured, whereas, when the sampling cycle is long, the detection accuracy in the rotational direction will be worse so that there has been a problem that the TPMS sensor (tire air pressure transmission device) cannot send the TPMS data (tire air pressure information) at a constant rotational position of wheel.

BRIEF SUMMARY

The objective of the embodiments resides in providing a tire air pressure transmission device and a tire air pressure monitoring system which suppress the consumption energy of the tire air pressure transmission device and ensure the accuracy with which the air pressure transmission device transmits the tire air pressure information.

In order to achieve the objective described above, according to first and second inventions, a sampling period or rate is set based on an acceleration in a centrifugal direction (centrifugal acceleration) of the wheel, and a gravitational acceleration component of the centrifugal acceleration is detected at each prescribed sampling period or interval.

According to third and fourth inventions, a sampling period is set based on a rotation frequency of the wheel, and a rotational position of the wheel is detected at each prescribed sampling period.

Further, according to fifth and sixth inventions, detection of the gravitational acceleration component of the centrifugal acceleration is started to be detected at a prescribed sampling period before the transmission of a wireless signal by the transmission mechanism, and the detection of a gravitational acceleration component value of the centrifugal acceleration will be stopped to be detected after the wireless signal is transmitted by the transmission unit.

Consequently, according to the present invention, in addition to the suppression of power consumption of the tire air pressure transmission device, a detection accuracy of the value of the gravitational acceleration component of the centrifugal acceleration may be secured.

BRIEF DESCRIPTION OF THE DRAWINGS

The description herein makes reference to the accompanying drawings wherein like reference numerals refer to like parts throughout the several views, and wherein:

FIG. 4 is a control block diagram illustrating a control block diagram of a TPMS control unit for executing the wheel position determination control in the first embodiment;

FIG. 17 is a diagram illustrating change in the gravitational acceleration component in accordance with a wheel speed in the third embodiment;

DETAILED DESCRIPTION

Figure 1:
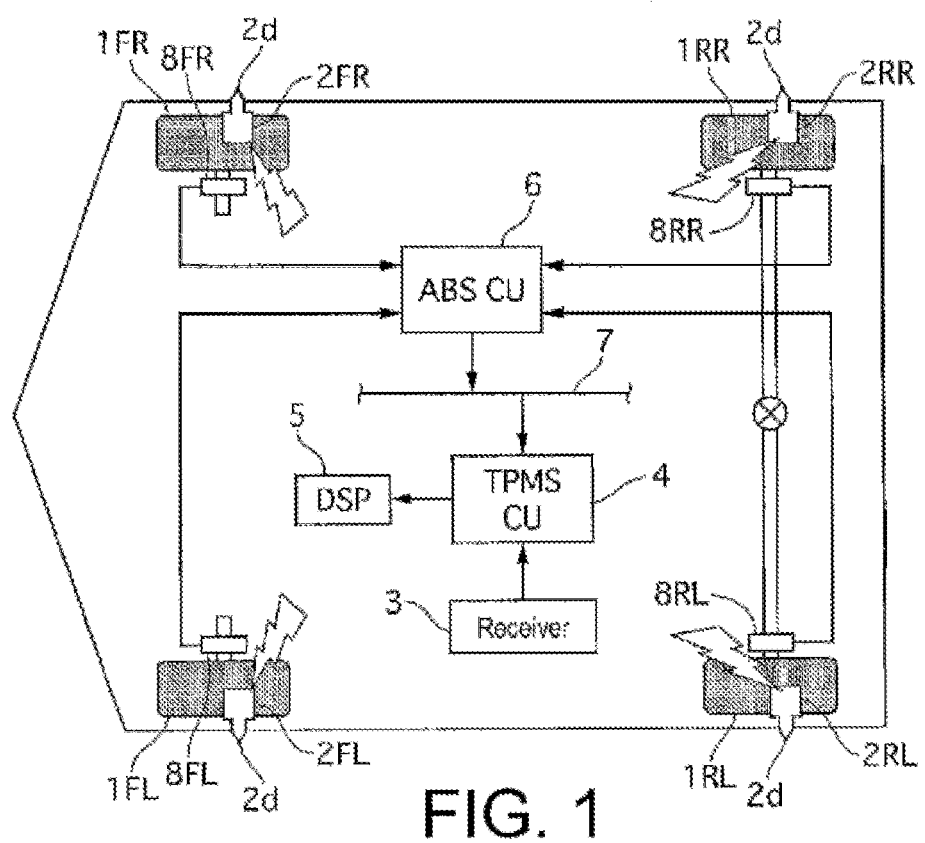
FIG. 1 is a configuration diagram illustrating a configuration of the tire air pressure monitoring device in a first embodiment.

FIG. 1 is a configuration diagram illustrating a tire air or pneumatic pressure monitoring system 13 in a first embodiment. In this figure, the end letters annexed to each reference sign is intended to indicate as follows: FL stands for the left front wheel, FR stands for the right front wheel, RL stands for the left rear wheel, and RR stands for the right rear wheel, respectively. In the following description, when not specifically necessary, the description of FL, FR, RL and RR will be omitted.

The tire air pressure monitoring device 13 in the first embodiment is provided with TPMS (Tire Pressure Monitoring System) sensors 2 and a TPMS main unit 14. The TPMS main unit 14 is provided with a receiver 3, a TPMS control unit 4, a display 5, and an ABS (Antilock Brake System) control unit 6, and a wheel speed sensors 8.

Figure 2:
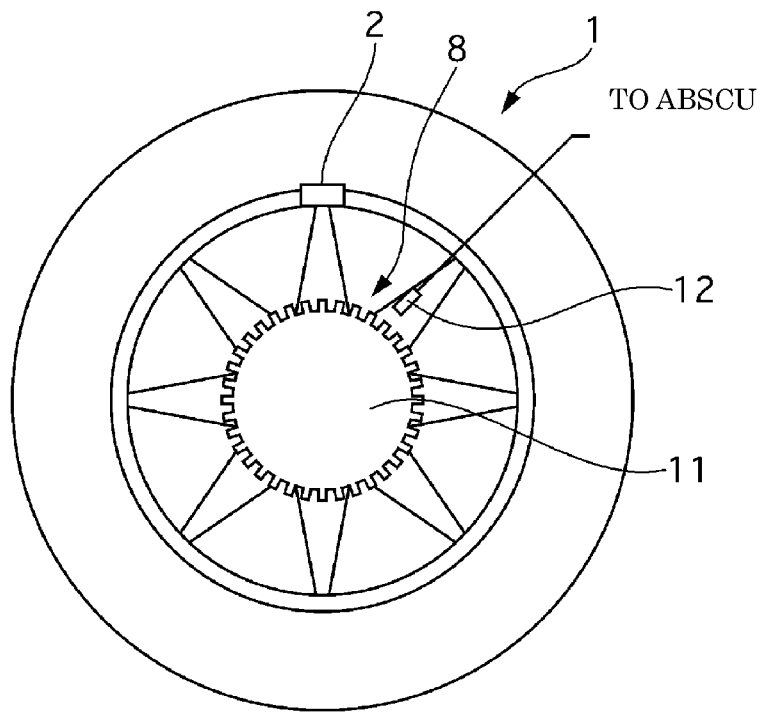
FIG. 2 is a schematic diagram illustrating a wheel in the first embodiment.

FIG. 2 shows a wheel 1. As shown in FIG. 2, a TPMS sensor 2 is installed on each of the wheels 1 at an air valve position near the outer circumferential side of the wheel 1.

Figure 3:
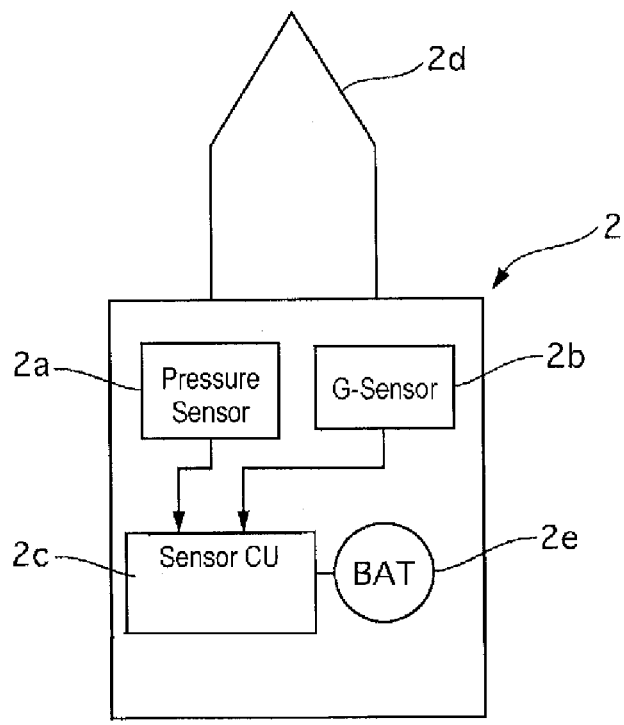
FIG. 3 is a configuration diagram of a TPMS sensor in the first embodiment.

FIG. 3 is a configuration diagram of the TPMS sensor 2. The TPMS sensor 2 comprises a pressure sensor 2a, an acceleration sensor 2b, a sensor control unit 2c, a transmitter 2d, and a button battery 2e.

The pressure sensor 2a detects a tire air pressure. The acceleration sensor 2b detects the acceleration in the centrifugal direction (centrifugal acceleration) [G] acting on the wheel. The sensor control unit 2c operates by the power supplied from the button battery 2e, and receives tire air pressure information from the pressure sensor 2a and centrifugal acceleration information from the acceleration sensor 2b, respectively. In addition, the TPMS data containing the air pressure information of the tire and a sensor ID (the identification information) that is previously set and unique to each TPMS sensor 2 is sent in a wireless signal from the transmitter 2d. In the first embodiment, the sensor IDs are defined by 1 to 4 associated with each of the TPMS sensors 2

The sensor control unit 2c compares the acceleration in the centrifugal direction detected by the acceleration sensor 2b with a preset threshold for determination of a vehicle running state. When the centrifugal acceleration is less than the running determination threshold, a determination is made that the vehicle is being stopped or stationary, so that transmission of the TPMS data is stopped. On the other hand, when the centrifugal acceleration exceeds the running determination threshold, a determination is made that the vehicle is running, and the TPMS data will be transmitted at a prescribed time The wheel speed sensor 8 is composed of a rotor 11 and a sensing part 12. As shown in FIG. 2, the rotor 11 is formed in a gear shape and is fixed coaxially to the center of rotation of the wheel 1 to be rotatable integrally. Faced on the protrusion surface of the rotor 11, the sensing part 12 is provided. The sensing part 12 is composed of a permanent magnet and a coil, As the rotor rotates, the concave-convex or protrusion surface of the rotor crosses the magnetic field formed on the periphery of the wheel speed sensor 8, so that the magnetic flux density varies to generate an electromotive force in the coil, and such a variation in the voltage is output as the wheel speed pulse signal to the ABS control unit 6.

The rotor 11 is made up of 48 teeth so that the sensing part 12 is configured to output a chain of pulses 48 times every time the wheel 1 rotates once.

The ABS control unit 6 receives a change of wheel speed pulse signals from each wheel speed sensor 8 to count the number of pulses to determine the wheel speed of each wheel 1 based on a change in the number of pulses in a predetermined time. When detected a locking tendency of a wheel 1 based on the wheel speed of each wheel 1, an anti-skid brake control is carried out by adjusting or holding a wheel cylinder pressure of that wheel to suppress the locking tendency by operating an ABS actuator not shown. Further, the ABS control unit 61 outputs a count value of the wheel speed pulses to a CAN communication line 7 at a constant interval (for example, every 20 msec.).

The receiver 3 receives a wireless signal output from each TPMS sensor to decode and output the TPMS control unit 4. The TPMS control unit 4 receives TPMS data from each TPMS sensor decoded in the receiver 3. The TPMS control unit 4 stores a correspondence relationship between each sensor ID and each wheel position in a nonvolatile memory 4d (see FIG. 7), and with reference to the correspondence relationship storing the sensor ID of the TPMS data, determines to which wheel position the TPMS data is corresponding. The tire air pressure contained in the TPMS data will be displayed on the display 5 as the air pressure corresponding to the wheel position. When the tire air pressure falls below the lower limit value, the decrease in tire air pressure will be informed to a driver by changing in display color, blinking indication or alarm sound.

As described above, based on the correspondence relationship between the sensor ID and the wheel position stored in the memory 4d, the TPMS control unit 4 determines to which wheel the received TPMS data belong. However, when a tire rotation is carried out while the vehicle stops, the correspondence relationship between the sensor ID and the wheel position stored in the memory 4d is not in agreement with the actual correspondence relationship, and it is impossible to find out to which wheel the TPMS data belong so that one cannot tell with which wheel the TPMS data is associated. Here, the "tire rotation" refers to the operation of swapping the installing wheel positions of the tires so as to ensure an even tread wear of the tires and, thus, to prolong the service lifetime (the tread lifetime). For example, for a passenger vehicle, usually the front/rear wheel tires are swapped while the left/right wheel tires.

Therefore, it is necessary to update the correspondence relationship between each sensor ID and each wheel position stored in memory 4d after the tire rotation. However, since a mutual communication between the TPMS sensor 2 installed on the wheel 1 and the TPMS control unit 4 installed on the vehicle body, in the tire air pressure monitoring system in the first embodiment, a protocol of the memory 4d at the update is previously set.

Now, description is made of the control of the TPMS control unit 4. When the vehicle stop determination time is equal to or greater than 15 minutes, the TPMS sensor 2 determines that the tire rotation may have been carried out.

When the vehicle stop determination time is less than 15 minutes, it is determined that no updating of the memory 4d is required and a "fixed time transmission mode" is selected. When the vehicle stop determination time is equal to or greater than 15 minutes, it is determined that updating of the memory 4d is necessary and a "fixed position transmission mode" will be selected.

First, description is made of a control of the TPMS sensor 2 in the fixed time transmission mode. The sensor control unit 2c determines a vehicle stop when the centrifugal acceleration detected by the acceleration sensor 3b is less than a vehicle running determination threshold value and stops to transmit the TPMS data. On the other hand, when the centrifugal acceleration is less than the vehicle running threshold value, a vehicle running state is determined and TPMS data will be transmitted in a constant period (at every one min., for example).

Now, description is made of a control of the TPMS sensor 2 during the fixed position transmission mode. In the fixed position transmission mode, with a shorter interval (with interval of 16 sec., for example) than the transmission period of the fixed position transmission mode and when the TPMS sensor 2 reaches a fixed rotational position (a top position of the wheel 1), TPMS data is broadcast. In other words, in the fixed position mode, after transmission of TPMS data, after elapse of 16 sec. when the TPMS sensor 2 reaches the top position of the wheel 1, next TPMS data will be transmitted, thus the length of the interval is not necessarily 16 sec.

The fixed position transmission mode is executed until the number of transmission of the TPMS data reaches a prescribed number of times (e.g., 40 rounds). When the number of times of the transmission reaches 40 times, the fixed position transmission mode transfers to a normal mode. When a determination has been made that the vehicle stops during the fixed position transmission mode and the vehicle stop determination time is less than 15 min., counting of the transmission of the TPMSS data will be continued upon restart. When the vehicle stop determination time is equal to or greater than 15 min., upon restart, the count of the TPMS data prior to the vehicle stop is reset and counting of the transmission is carried out.

The TPMS sensor transmits, as described above, TPMS data when the TPMS sensor 2 has reached a fixed rotational position (for example, the top position of the wheel 1). TPSS sensor detects that its own position has reached the top position of the wheel 1 through an acceleration sensor 2b.

FIG. 4 is graphs illustrating changes in both the wheel speed and the centrifugal acceleration detected by the acceleration sensor 2b. FIG. 4(a) shows a wheel speed, FIG. 4(b) shows a centrifugal acceleration, FIG. 4(c) shows a gravitational acceleration component of the centrifugal acceleration, and FIG. 4(d) shows a graph illustrating a centrifugal component of the centrifugal acceleration, respectively.

The centrifugal acceleration may be divided into a centrifugal component that generates due to a centrifugal force produced in accordance with rotation of the wheel 1 and a gravitational acceleration component that generates due to a gravitational acceleration.

The centrifugal acceleration exhibits a waviness profile, but changes so as to follow the wheel speed as shown in FIG. 4 (a) as a whole. As shown in FIG. 4(d) the centrifugal force component develops substantially in synchronization with the wheel speed. On the other hand, the gravitational acceleration component becomes a sine wave that travels back and forth between −1 [G] and +1 [G], as shown in FIG. 4(c), the period thereof becomes shorter as the wheel speed increases. This is because, when the TPMS sensor 2 comes to the top point of the wheel, the gravitational acceleration component reaches +1 [G], and, when it comes to the bottom or lowest point, the direction of the TPMS sensor 2 is the opposite from that at the top point with "−1" [G] being detected. At a 90 degree position with respect to the top and bottom points, it becomes "0" [G].

Since the period of the gravitational acceleration component of the centrifugal acceleration synchronizes with the rotation period of the wheel 1, by monitoring both the magnitude and direction of the gravitational acceleration component, the rotational position of the TPMS sensor 2 may be determined. Thus, for example, TPMS sensor 2 will be determined to be located on the top or highest point of the wheel 1 at the peak of the gravitational acceleration component (+1 [G]), TPMS sensor 2 may output TPMS data steadily or constantly at the top point by outputting TPMS data at this position.

Figure 5:
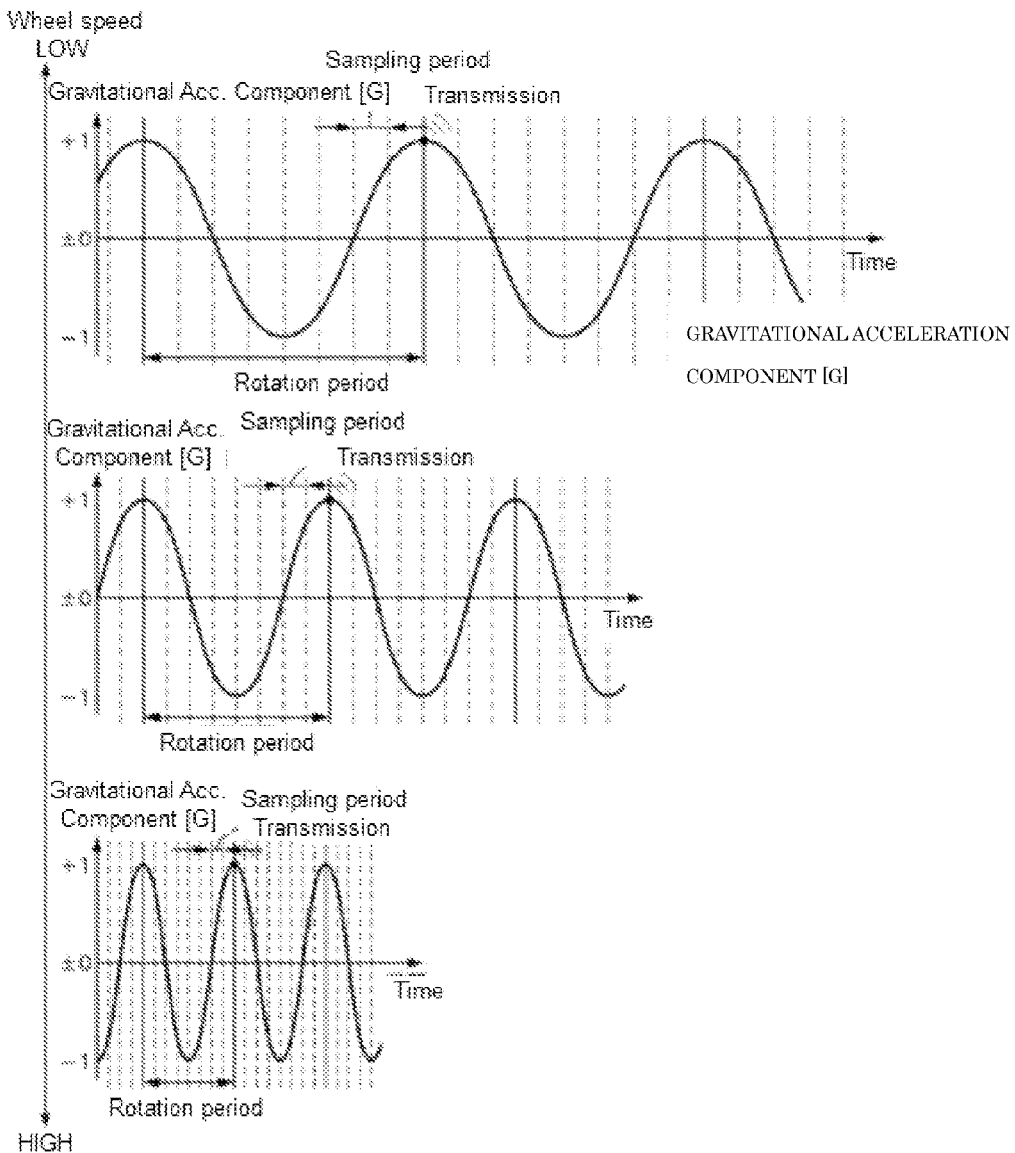
FIG. 5 is a diagram illustrating changes in the gravitational acceleration component in accordance with the wheel speed in the first embodiment.

FIG. 5 is a diagram showing changes in the gravitational acceleration component in accordance with the wheel speed. In FIG. 5, the wheel speed is depicted to change from a low value to a high value when advancing from top to bottom of the figure. As shown in FIG. 5, since the rotation period of the wheel 1 becomes shorter as the wheel speed increases, the period of the gravitational acceleration will be likewise shorter.

Although the sensor control unit 2c monitors the value of the gravitational acceleration component at each prescribed sampling rate or period, in order to enhance the detection accuracy of the peak of the gravitational acceleration component, it is necessary to secure a certain number of samples within one cycle or period of the gravitational acceleration component. On the other hand, increase in the number of samplings will lead to larger power consumption so that the long life of the button battery 2e would not be ensured.

Stated in another way, it is necessary to suppress the power consumption by lengthening the sampling period when the wheel speed is low. Further, it is necessary to increase the detection accuracy of the gravitational acceleration component by shortening the sampling period when the wheel speed is high.

Figure 4A:
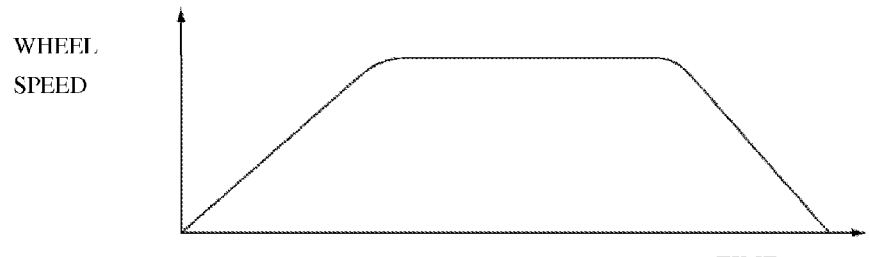
FIG. 4A is a graph illustrating changes in a wheel speed in the first embodiment.
Figure 4B:
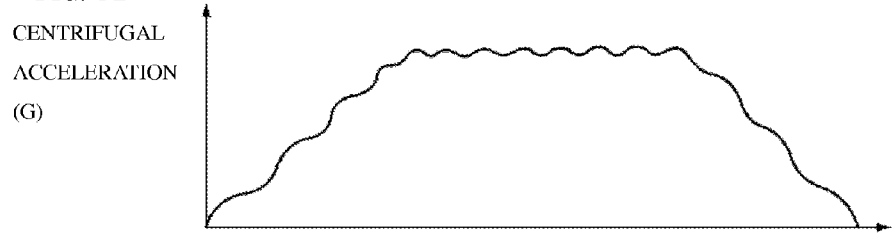
FIG. 4B is a graph illustrating changes in the centrifugal acceleration in the first embodiment.
Figure 4C:
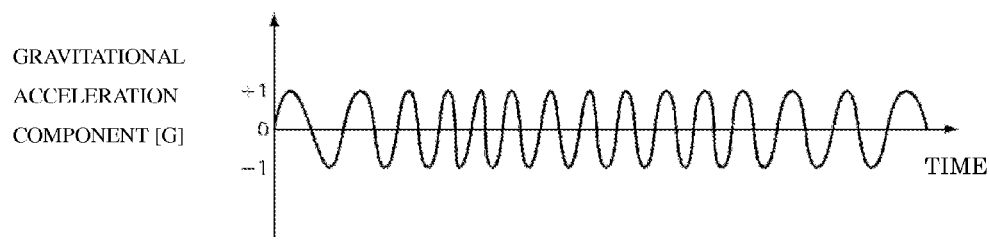
FIG. 4C is a graph illustrating changes in the gravitational acceleration in the first embodiment.
Figure 6:
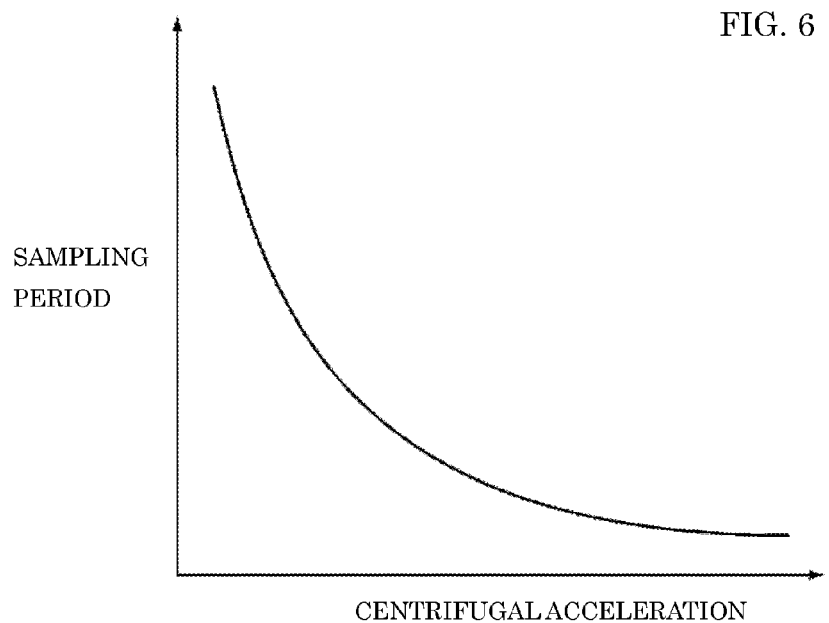
FIG. 6 is a diagram of the sampling period in accordance with the centrifugal acceleration in the first embodiment.

FIG. 6 shows a diagram for setting a sampling period in accordance with the centrifugal acceleration. As described above, although the centrifugal acceleration has a wavy profile as shown in FIG. 4(b), it changes as a whole to follow the wheel speed shown in FIG. 4(a).

Figure 4D:
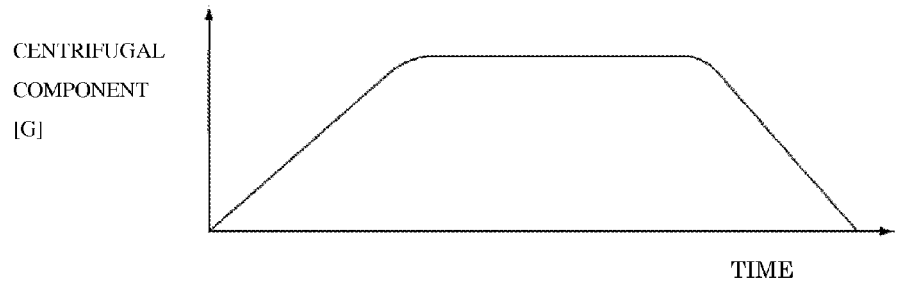
FIG. 4D is a graph illustrating changes in the centrifugal component in the first embodiment.
Figure 8:
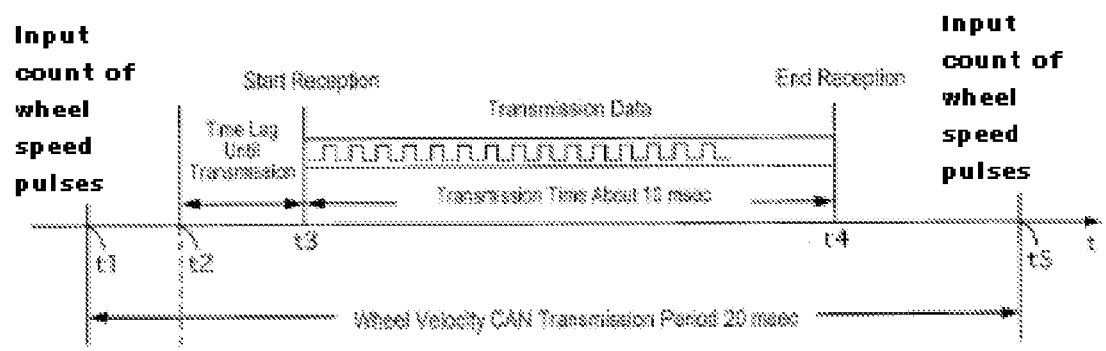
FIG. 8 is a diagram illustrating a method of the rotational position calculation of each wheel in the first embodiment.

Thus, as shown in FIG. 8, by setting the sampling period shorter as the centrifugal acceleration is greater, an appropriate setting of the sampling period is possible and both the suppression in power consumption and the detection accuracy in the gravitational acceleration component will be improved. Note that, since the centrifugal force component changes substantially in synchronization with the wheel speed as shown in FIG. 4(d), the centrifugal force component may be used in place of the centrifugal acceleration.

Further, when the centrifugal acceleration detection value of the acceleration sensor 2b exceeds a predetermined acceleration, monitoring of the gravitational acceleration component will be stopped. The predetermined acceleration is set to such an acceleration that would not occur during the vehicle travel, and when the centrifugal acceleration detection value of the acceleration sensor 2b exceeds the predetermined value, it is configured such that the determination of occurrence of abnormal fixation or the like may be made.

This is intended to prevent the power consumption from being increased with the sampling period being set to a shorter value when abnormality occurs in the acceleration sensor 2b.

The TPMS control unit 4 determines that there is a possibility that the tire rotation is performed when the vehicle stop determination time is 15 min. or more. It is determined that there is no need to update the memory 4d when the vehicle stop determination time is below 15 min. below and a "monitor mode" will be selected. The need to update the memory 4d is determined when the vehicle stop determination time is 15 min. or more and a "learning mode" will be selected.

Now, description is made of a control of the TPMS control unit during the monitoring mode. During the monitoring mode, the TPMS control unit 4 receives a sensor ID of the TPMS data input from the receiver 3, and with reference to a correspondence relationship between each sensor ID and each wheel position stored in the nonvolatile memory 4d, determines which data of the wheel position that TPMS data belong. Then, the tire air pressure contained in the TPMS data will be displayed to the display 5 as the air pressure of the wheel 1. Further, when the air pressure of the tire falls below a lower limit, a driver is alerted to decrease in tire air pressure, a driver is informed of decrease in air pressure by changing display color, blinking display and alarm sound.

Now, description is made of a control of the TPMS control unit 4 during a learning mode. The learning mode is continued to be executed until the determination is made in which to which wheel position each TPMS sensor 2 belongs, or, a cumulative travel time (e.g. 8 minutes) from the start of the learning mode has elapsed. After completion of the learning mode, the control transfers to a monitoring mode.

Note that, even in the midst of the learning mode, since the TPMS data will be input from time to time, a display of the air pressure and thus an alert to decrease in air pressure will be made based on the correspondence relationship before the updating between each sensor ID and each wheel position stored in the memory 4d.

In the learning mode, the rotational position of each wheel is acquired at the time at which the position of the TPMS sensor 2 which has transmitted the TPMS data including a certain sensor ID based on the count value of the wheel speed pulses from the ABS control unit 6 and the time in which the TPMS data including that certain sensor ID is received.

In the fixed position transmission mode, since the TPMS sensor 2 transmits the TPMS data upon reaching the fixed rotational position so that, when the rotational position of each of the wheels 1 is available when the TPMS sensor with ID1, for example, has transmitted the TPMS data a plurality of times, the rotational position of wheel 1 on which the TPMS sensor with ID1 is installed is always constant. On the other hand, the rotational position for other wheels 1 will vary depending on every transmission.

This is because, when the vehicle travels or runs, the rotation speed of each wheel 1 may different from each other due to the difference in tracks between the outer and inner wheels, the lock and the slip of the wheels 1, and the difference in the air pressure of the tires. Even when the vehicle runs straight, as the driver still may make minute corrections on the steering wheel and there is a certain difference in the road surface between the left and right sides, the difference in the rotation speed still develops between the front and rear wheels, and between the left and right wheels.

Description is now made in detail of a wheel position determination control which takes place during the learning mode by the TPMS control unit 4. For simplicity of description, only the process for determining the wheel position of the TPMS sensor 2 with ID1 is described, the process of determining the position of the wheels of the other TPMS sensor 2 is performed in the same manner.

Figure 7:
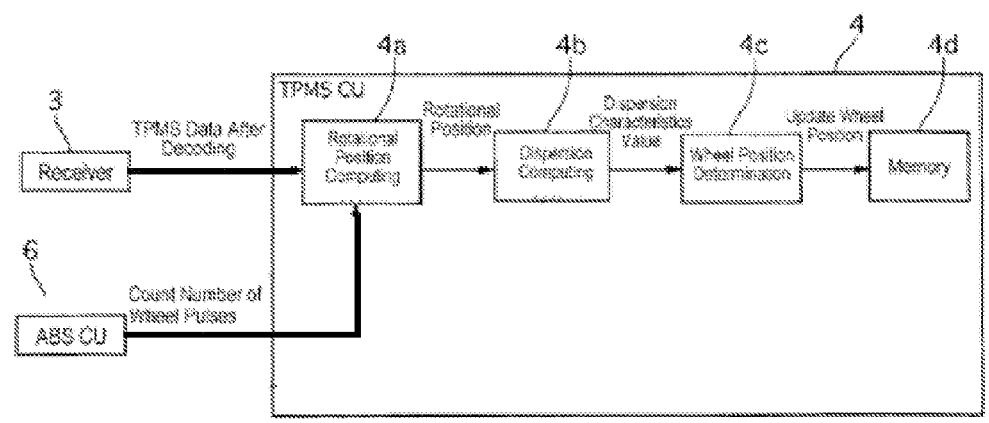
FIG. 7 is a control block diagram of a TPMS control unit in the first embodiment.

FIG. 7 is a control block diagram of the TPMS control unit 4 for executing the wheel position determination control. The TPMS control unit 4 has a rotational position calculation unit 4a, a dispersion calculation section 4b, a wheel position determination unit (the wheel position determination mechanism) 4c, and a memory 4d.

The rotational position calculation unit 4a receives the TPMS data after being decoded to be output from the receiver 3 and the count values of the wheel speed pulses output from the ABS control unit 6 to calculate a rotational position for each wheel when the rotational position of the TPMS sensor with ID1 assumes the top point.

As described above, the rotor 11 has 48 teeth. However, the ABS control unit 6 only counts the wheel speed pulses, and not in a position to identify each tooth. Thus, by allocating a tooth number to each of 48 teeth by the rotational position calculation unit 4a and determines the rotational position of the wheel 1 based on the number of tooth allocated. Upon start of the learning mode, the rotational position calculation unit 4a accumulates and stores the count value of the wheel speed pulses input from the ABS control unit 6. The number of tooth may be acquired by adding 1 to a remainder after division of the cumulative value of the wheel speed pulses by the number of teeth 48.

There occurs a time delay between the time at which the TPMS sensor 2 with ID1 transmits the TPMS data and the time at which the receiver 3 receives the TPMS data. Further, a time delay also occurs between the TPMS sensor 2 with the ID1 has reached the top point and the time at which the TPMS data is actually transmitted.

Since the TPMS control unit 6 may not directly recognize the time at which the TPMS sensor has reached the top point, the time at which the TPMS sensor 2 has reached the top point is estimated by calculating back from the time the receiver 3 received the TPMS data and it is necessary to calculate the rotational position of each wheel at that time.

In addition, the count value of the wheel speed pulses will not be received from the ABS control unit 6 at every 20 msec. In other words, since the count value at every single pulse is not input, it is necessary to calculate the number of tooth when the TPMS sensor 2 with ID1 has reached the top or highest point.

FIG. 8 is a diagram describing a calculation method to obtain the number of tooth (rotational position of the wheel 1) of the rotor 11 when the TPMS sensor 2 has transmitted the TPMS data.

In FIG. 8, t1 represents the time when the count value of the wheel speed pulses is input; t2 represents the time when the rotational position of the TPMS sensor 2 with ID1 reaches the top point; t3 represents the time when the TPMS sensor 2 with ID1 actually starts the transmission of the TPMS data; t4 represents the time when the reception of the TPMS data is completed; and t5 represents the time when the count value of the wheel speed pulses is input. The TPMS control unit 6 directly knows the time t1, t4, and t5. The time t3 can be calculated by subtracting the data length (nominal value, e.g., about 10 msec.) of the TPMS data from the time t4; and t2 can be calculated by subtracting a time lag (previously available via experiment and the like) in the transmission. Within 20 msec., change in the wheel speed is sufficiently small so that a constant speed is presumed.

Assuming the number of tooth n1 at time t1, the number of tooth n2 at time n2, and n5 at time t5, respectively, $(t2-t1)/(t5-t1)=(n2-n1)/(n5-n1)$ is established. Thus $n2-n1=(n5-n1)*(t2-t)/-(t5-t1)$.

The number of tooth n2 at the time t2 at which the rotational position of the TPMS sensor 2 with ID1 has reached the top point may be obtained by the following formula: $n2=n1+(n5-n1)*(t241)/(t5-t1)$.

The dispersion calculation unit 4b accumulates the number of tooth of each wheel 1 calculated by the rotational position calculation unit 4a at the time t2 point at which the TPMS sensor 2 with ID1 has reached the top point, and calculates the dispersion degree in the rotational data of each wheel as the dispersion characteristic value.

Figure 9:
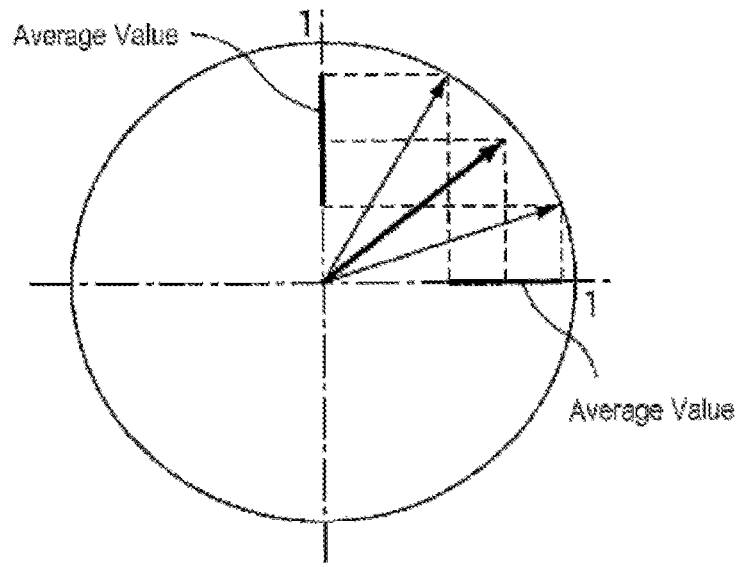
FIG. 9 is a diagram illustrating a calculating method of the dispersion characteristic value.

FIG. 9 is a diagram illustrating a method for calculating the dispersion characteristic value. According to the first embodiment, a unit circle (a circle with radius of 1) with the origin (0, 0) on the two-dimensional plane is assumed, and the rotational position θ [deg] (=360×the number of teeth of the rotor/48) of each wheel 1 is converted to the circumferential coordinates (cos θ, sin θ) on the unit circle. More specifically, the rotational position of each wheel 1 is calculated as follows: regarding a vector having the origin (0, 0) as the starting point and the coordinates (cos θ, sin θ) as the end with a length of 1, the average vectors (ave_cos θ, ave_sin θ) of each vector of the same rotational position data are obtained, and the scalar quantity of the average vector is calculated as the dispersion characteristic value X of the rotational position data:

$$(\cos θ, \sin θ) = (\cos((n2+1)*2\pi/48), \sin((n2+1)*2\pi/48))$$

Consequently, suppose the number of times of reception of the TPMS data with respect to the identical sensor ID as N (N is a positive integer), the average vectors (ave_cos θ, ave_sin θ) are expressed as follows:

$$(\text{ave\_cos } θ, \text{ave\_sin } θ) = ((\Sigma(\cos θ))/N, (\Sigma(\sin θ))/N)$$

The dispersion characteristic value X can thus be represented as follows:

$$X = \text{ave\_cos } θ2 + \text{ave\_sin } θ2$$

The wheel position determination unit 4c works as follows. The dispersion characteristic values X of rotational position data of each wheel 1 is compared to each other, and when the greatest value of the dispersion characteristic values X is greater than a first threshold (e.g., 0.57) and the remaining 3 dispersion characteristic values X are all less than a second threshold (e.g., 0.37), a determination is made that the wheel 1 corresponding to the maximum dispersion characteristic value X is installed with the TPMS sensor 2 with ID1, and the correspondence relationship between the TPMS sensor with ID1 and the position of the wheel 1 is updated in the memory 4d.

Figure 10:
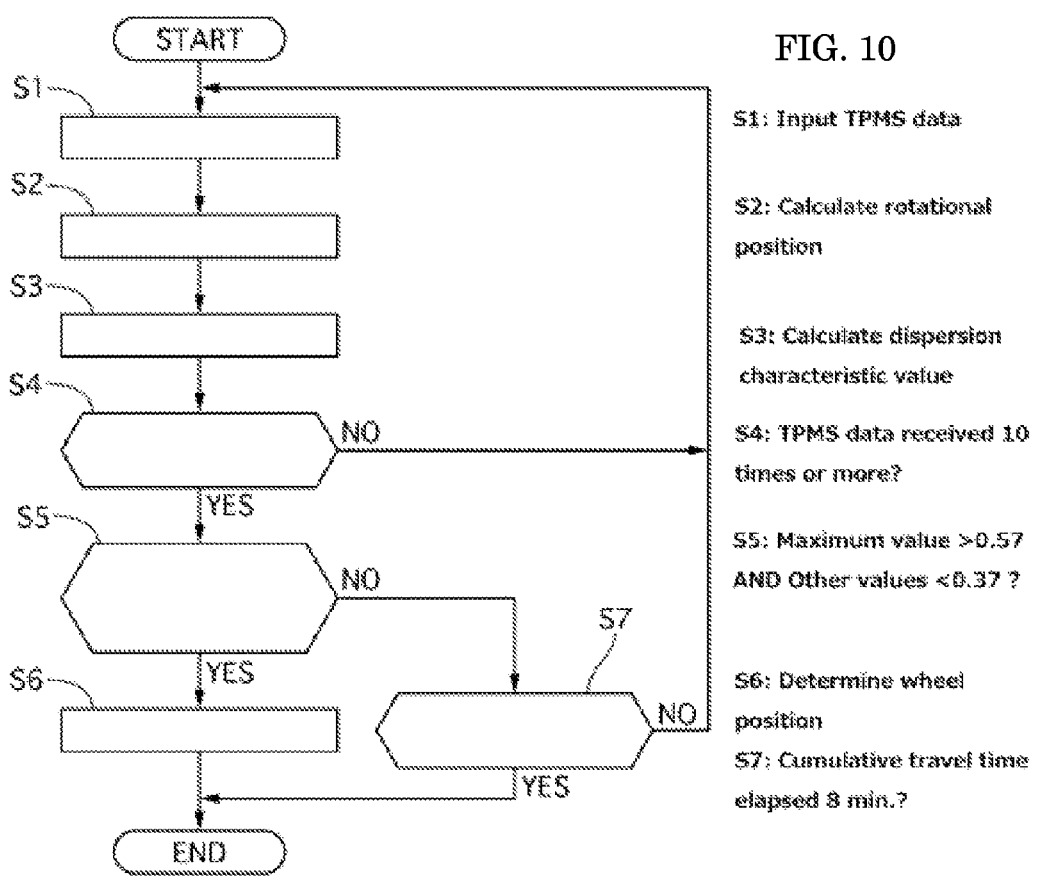
FIG. 10 is a flowchart illustrating a control process of the wheel position determination in the first embodiment.
Figure 11A:
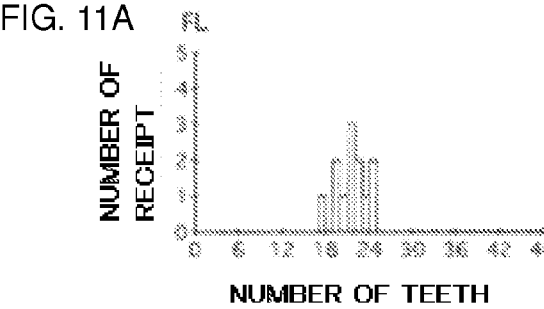
FIG. 11A is a diagram illustrating a relationship between the rotational positions of wheel FL and the number of receipt of TPMS data.
Figure 11B:
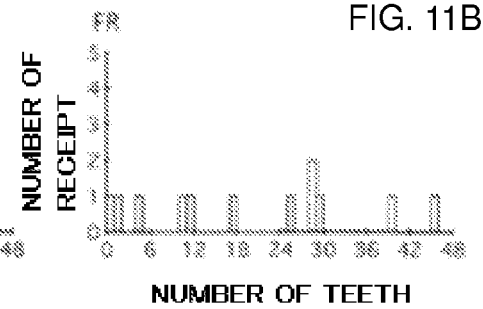
FIG. 11B is a diagram illustrating a relationship between the rotational positions of wheel FR and the number of receipt of TPMS data.
Figure 11C:
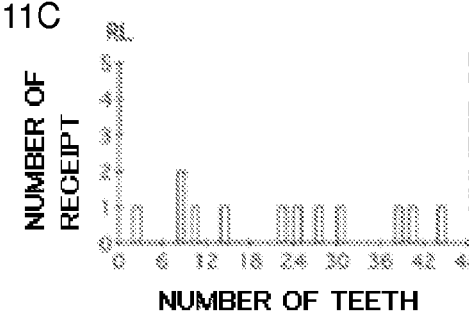
FIG. 11C is a diagram illustrating a relationship between the rotational positions of wheel RL and the number of receipt of TPMS data.
Figure 11D:
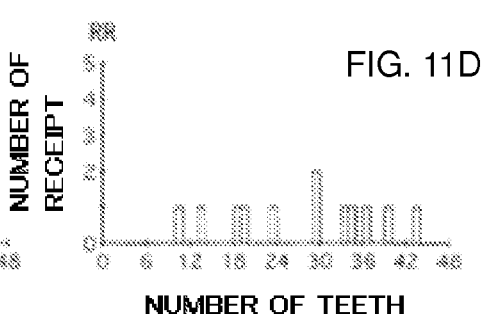
FIG. 11D is a diagram illustrating a relationship between the rotational positions of wheel RR and the number of receipt of TPMS data.

FIG. 10 is a flow chart illustrating the flow of the wheel position determination control process. In the following, respective steps of operation will be described. In the following description, the case of the sensor ID being "1" is assumed. However, for the other IDs (ID=2, 3, 4), the wheel position determination control process is also carried out in parallel.

In step S1, the rotational position calculation unit 4a receives the TPMS data with the sensor ID being1. In step S2, the rotational position calculation section 4a calculates the rotational position of each wheel 1.

In step S3, the dispersion calculation unit 4b calculates the dispersion characteristic values X of the rotational position data of each wheel 1. In step S4, a determination is made as to whether the TPMS data with sensor ID1 are received for a prescribed number of times (e.g., 10 times) or more. If the determination result is YES, the operation goes to step S5. If the determination is NO, the operation returns to step S1.

In step S5, the wheel position determination section 4c determines whether the greatest or maximum value of the dispersion characteristics value is over the first threshold of 0.57, and whether the value of the remaining dispersion characteristic values are less than the second threshold of 0.37. If the determination is YES, the operation goes to step S6; if the determination result is NO, the operation goes to step S7.

In step S6, the wheel position determination section 4c determines the wheel position of the rotational position data corresponding to the maximum or highest dispersion characteristic value as the wheel position of the sensor ID1. Then, the learning mode ends.

In step S7, the wheel position determination section 4c determines whether a predetermined cumulative or accumulated running time (e.g., 8 min.) has elapsed from the start of the learning mode. If the determination result is YES, the learning mode is terminated. If the determination result is NO, the operation returns to step S1.

When the wheel position determination section 4c can determine the wheel positions for all of the sensor IDs within the prescribed accumulated travel time, the correspondence relationship between the sensor ID and the wheel position is updated and stored in the memory 4d for registration. On the other hand, when it has been impossible to determine the wheel position for all of the sensor IDs within the prescribed cumulative travel time, no updating takes place and the correspondence relationship between the sensor IDs and each wheel position currently stored in the memory 4d is continued to be used.

Now, description is made assuming that the wheel position of the TPMS sensor 2 with ID1 has been set to left front wheel 1FL as a result of the tire rotation.

Each TPMS sensor 2 works as follows: when the vehicle stop determination time immediately before the start of vehicle running is 15 min or more, a determination is made that there is a possibility that the tire rotation has been carried out, and the operation goes from the fixed time transmission mode to the fixed position transmission mode. In the fixed position transmission mode, after 16 seconds has elapsed from the previous transmission time and the rotational position of own TPMS sensor reaches the top point, hereupon each TPMS sensor 2 transmits the TPMS data.

On the other hand, when the vehicle stop determination time is 15 min. or more, the PPMS control unit 4 goes from the monitoring mode to the learning mode. In the learning mode, each time the TPMS data are received from each TPMS sensor 2, the TPMS control unit 4 calculates the rotational position (the number of tooth of the rotor) of each wheel 1 when the rotational position of the TPMS sensor 2 has reached to top point every time of receipt of the TPMS data from the TPMS sensor 2, based on the input time of the count value of the wheel speed pulses, the time of completion of receipt of the TPMS data, and the like. This is carried out repeatedly for 10 or more times and accumulated as the rotational position data. Among the rotational position data, the wheel position to which the rotational position data with least degree of dispersion is determined as the wheel position of that TPMS sensor 2.

Since the TPMS sensor installed on a certain tire 1 rotates integrally with the rotor 11, and the TPMS sensor transmits the TPMS data upon reaching the constant rotational position, the period with which the TPMS sensor 2 transmits the TPMS data and the rotation period of the rotor 11 are always synchronized (matches) irrespective of the travel distance and running conditions.

As described above, when the vehicle travels or runs, since the rotation speed of each wheel 1 may different from each other due to the difference in tracks between the outer and inner wheels, the lock and the slip of the wheels 1, for example, the transmission period of the TPMS data with ID1 may be in agreement with the rotation period of the rotor, whereas the transmission period of the TPMS data with ID1 may not match the rotation period of the rotor 11 of other wheels.

Consequently, by observing the degree of dispersion in the rotational position data of each wheel 1 with respect to a transmission period of the TPMS data, it is possible to make a highly precise determination on the wheel positions of each TPMS sensor 2.

FIGS. 11A-11D illustrate the relationship between the rotational positions (the number of tooth of the rotor 11) of the wheels 1FL, 1FR, 1RL, and 1RR, respectively, when the rotational position of the TPMS sensor 2 with ID reaches the top point and the number of times of reception of the TPMS data. Here, FIG. 11(a) corresponds to the wheel speed sensor 8FL of the left front wheel 1FL, FIG. 11(b) corresponds to the wheel speed sensor 8FR of the right front wheel 1FR, FIG. 11(c) corresponds to the wheel speed sensor 8RL of the left rear wheel 1RL, and FIG. 11(d) corresponds to the wheel speed sensor 8RR of the right rear wheel 1RR.

As will be evident from FIGS. 11A-11D, whereas the dispersion degrees are high in the rotational positions (the number of tooth of the rotor 11) obtained from the wheel speed sensors 8FR, 8RL, and 8RR with respect to the right front wheel 1FR, the left rear wheel 1RL, and the right rear wheel 1RR, the dispersion degree of the wheel position obtained from the wheel speed sensor 8FL with respect to the left front wheel 1FL is the smallest or least, so that it is confirmed that the transmission period of the TPMS data with ID1 and the rotation period of the rotor 11 are substantially in synchronization. Thus, it may be determined that the position of the TPMS sensor 2 with ID1 is installed on the left front wheel 1FL.

The dispersion is generally defined by the average of the "square of the difference from the average or mean. However, since the rotational position of the wheel 1 is indicated by the angle data with periodicity, the dispersion degree of the rotational position cannot be determined using the general dispersion.

Thus, in the first embodiment, the dispersion calculation unit 4b works as follows. The rotational position θ of each wheel 1 obtained from each wheel speed sensor 8 is converted to the circumferential coordinates (cos θ, sin θ) of a unit circle having the origin (0, 0) at the center. The coordinates (cos θ, sin θ) are taken as vectors, the average vectors (ave_cos θ, ave_sin θ) of the vectors of the same rotational position data are acquired, and the scalar quantity of the average vector is calculated as the dispersion characteristic value X. As a result, it is possible to avoid the periodicity in determining the dispersion degree of the rotational position.

Figure 12:
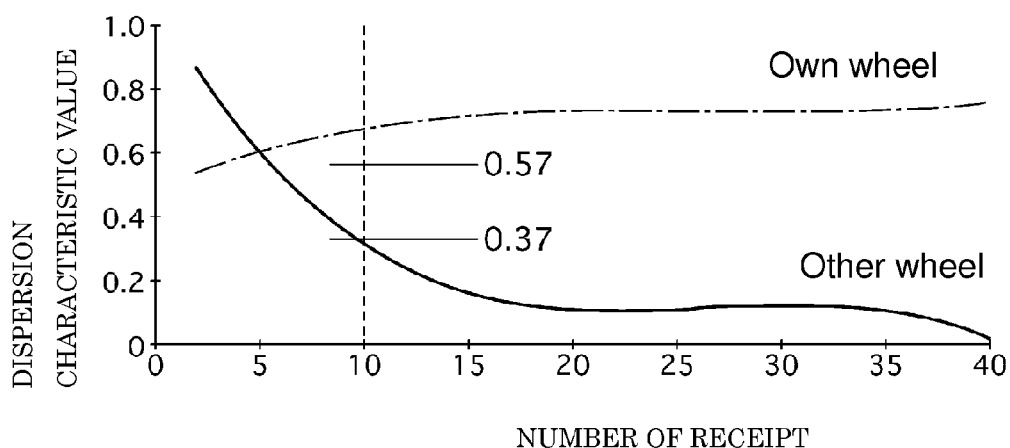
FIG. 12 is a diagram illustrating change in the dispersion characteristic value X in accordance with the number of receipt of TPMS data in the first embodiment.

FIG. 12 shows a diagram illustrating a change in the dispersion characteristic value X in accordance with the number of receipt of the TPMS data for ID1. In FIG. 12, a dashed line denotes the dispersion characteristic value X of the left front wheel 1FL while a solid line denotes the dispersion characteristic value X of rotational position for the right front wheel 1FR, left rear wheel 1RL, right rear wheel 1RR.

As shown in FIG. 12, as the number of receipt of the TPMS data for the sensor ID1 increases, such a trend is indicated in which the dispersion characteristic X in the rotational position of the left front wheel 1FL approaches "1" while the dispersion characteristic values X for the right front wheel 1FR, left rear wheel 1RL, and right rear wheel 1RR approach "0". Thus, it may be ideal to select the maximum value (i.e. the dispersion characteristic value nearest to "1") at the attainment of sufficient number of receipt (about several ten times). However, since it is impossible to inform the driver of accurate tire state information during the wheel position determination period of the TPMS sensor 2, the prolonged determination time is not preferable. On the other hand, at the insufficient number of receipt (such as several times), no difference in the dispersion characteristic value X is noticeable, which would lead to decrease in determination accuracy.

Thus, in the tire air pressure monitoring system according to the first embodiment, the wheel position determination unit 4c compares, when the TPMS data for the same sensor ID ten times or more, the dispersion characteristic values X of the rotational position data of each wheel when the specific sensor ID has been transmitted. The wheel position determination unit 4c further detects that the maximum value of the dispersion characteristic values X exceeds a first threshold value 0.57 while the remaining three dispersion characteristic values fall below a second threshold value 0.37, then the wheel position of the rotational position data corresponding to the maximum dispersion characteristic value X will be identified as the wheel position of the TPMS sensor 2 with that sensor ID.

Not only through selection of the maximum value of the dispersion characteristic values, by comparing the maximum value with the first threshold value (0.57), a certain degree of determination accuracy may be ensured. In addition, by comparing the dispersion characteristic values other than the maximum value with the second threshold value (0.37), a predetermined difference (of 0.2 or more) can be confirmed, which further enhances the determination accuracy. Therefore, at a relatively small number of receipts, such as ten times, both the determination accuracy and shortening of determination time may be achieved.

Each TPMS sensor 2 transmits TPMS data after 16 seconds has elapsed from the previous transmission time of TPMS data and at the time at which the own rotational position reaches the top point. Since the dispersion characteristic values X of each wheel 1 are compared to each other for determination of the wheel position, with respect to the TPMS sensor 2 which has transmitted TPMS data with a specific ID, a certain amount of cumulative travel distance will be necessary in order to create a difference in the dispersion characteristic values X between the wheel 1 on which that specific TPMS sensor 2 is installed and the dispersion characteristic value X of the other wheel.

In this conjunction assuming that TPMS data would be transmitted each time the rotational position of the TPMS sensor 2 reaches a top point, no substantial difference in dispersion characteristic value X will be expected so that it may be difficult to perform a wheel position determination.

Thus, by setting a transmission interval at 16 seconds or more, a certain amount of cumulative travel distance will be obtained until the TPMS data will be received ten times or more. Therefore, a sufficient difference in the dispersion characteristic value X may be created to ensure an accurate determination of the wheel position.

Upon transmitting TPMS data forty (40) times during the constant position transmission mode, the TPMS sensor 2 transfers to the normal mode. The TPMS sensor 2 consumes the power of the button battery 2e at the transmission of the TPMS data so that the battery life time of the button battery 2e will be shorter as the constant position transmission mode continues.

Thus, when each wheel position may not be determined despite the elapse of sufficient cumulative travel time, the constant position transmission mode will be terminated to transfer to the normal mode, which may suppress decrease in battery life time.

On the other hand, when the TPMS control unit 4 cannot determine the correspondence between each sensor ID and each wheel position despite elapsed time of cumulative travel of eight (8) minutes, the learning mode will be terminated and the process transitions to the monitoring mode. The total number of TPMS data is thirty (30) times or less when the cumulative travel time has passed eight minutes, the auto-learning mode may be terminated substantially in synchronization with the completion of the constant position transmission mode of the TPMS sensor 2.

Although the sensor control unit 2c is monitoring the value of the gravitational acceleration component at each predetermined sampling period or cycle, in order to improve the detection accuracy of the peak of the gravitational acceleration component, it is necessary to secure a certain number of sampling within one period of the gravitational acceleration component. Meanwhile, since the power consumption becomes large as the number of samples is increased, lengthening of life time of the button battery 2 will not be achieved.

Therefore, in the tire pressure monitoring system according to the first embodiment, the sensor control unit 2c is configured to set the sampling period shorter as the centrifugal acceleration is larger. Therefore, it is possible to properly set the sampling period and improve the detection accuracy of the gravitational acceleration component while suppressing the power consumption.

Further, when a detection value of the centrifugal acceleration is equal to or greater than a predetermined acceleration, the monitoring of the gravitational acceleration component is stopped. Thus, it is possible to prevent an increase in power consumption due to shortening of the sampling period when there is a failure in the acceleration sensor 2b.

In the TPMS sensor 2 according to the first embodiment, following effects may be exhibited.

In a TPMS sensor 2 (tire air pressure transmission device) installed on the outer periphery of a wheel 1 to transmit tire air pressure information of the wheel 1, provided are an acceleration sensor 2b (acceleration detection mechanism) that detects a centrifugal acceleration while the wheel 1 rotates; a sensor control unit 2c (gravitational acceleration component detection mechanism) that sets a sampling period based on the centrifugal acceleration and detect a value of the gravitational acceleration component of the centrifugal acceleration at each set sampling period, and a transmitter 2d (transmission mechanism) that transmits the tire air pressure information in a wireless signal when the gravitational acceleration component of the centrifugal acceleration has reached a predetermined value. Therefore, the sampling period may be set appropriately, and both the suppression of power consumption and the enhancement of the detection accuracy in the gravitational acceleration component may be achieved.

The sensor control unit 2c is configured to set the sampling period shorter as the centrifugal acceleration is greater. Therefore, when the wheel speed is low, the power consumption may be suppressed by lengthening the sampling period while, when the wheel speed is high, the detection accuracy in the gravitational acceleration component will be enhanced by shortening the sampling period.

The sensor control unit 2c is configured to stop detection of the value of the gravitational acceleration component of the centrifugal acceleration when the centrifugal acceleration detected by the acceleration sensor 2b is a predetermined acceleration or more. Therefore, when a failure occurs with the acceleration sensor 2b, increase in the power consumption due to the sampling period being set shorter.

In addition, in the tire air pressure monitoring system 13 in the first embodiment, the following effects may be achieved:

In a tire air pressure monitoring system 13 with a TPMS sensor 2 (tire air pressure transmission mechanism) installed on the outer periphery of a wheel 1 to transmit tire air pressure information of the wheel 1 via a wireless signal and a TPMS main part 14 (tire air pressure monitoring main part) installed on a vehicle body for receiving the wireless signal and monitoring the tire air pressure of each wheel, the TPMS sensor 2 is provided with a pressure sensor 2a (tire air pressure detection mechanism) that detects the tire air pressure, an acceleration sensor 2b (acceleration detection mechanism) that detects a centrifugal acceleration while the wheel 1 rotates; a sensor control unit 2c (gravitational acceleration component detection mechanism) that sets a sampling period based on the centrifugal acceleration and detects a value of gravitational acceleration component of the centrifugal acceleration at each set sampling period, and a transmitter 2d (transmitting mechanism) that transmits the tire air pressure information in a wireless signal with identification information unique to the TPMS sensor 2 when the gravitational acceleration of the centrifugal acceleration has reached a predetermined value, wherein the TPMS main part 14 is provided with a receiver 3 (receiving mechanism) that receives the tire air pressure information transmitted from the transmitter 2d of each TPMS sensor 2, an ABS control unit 6 (rotational position detection mechanism) that detects the rotational position of each wheel 1, and a TPMS control unit 4 (wheel position determination mechanism) that determines the wheel position to which the TPMS sensor 2 is installed based on the rotational position of each wheel detected by the wheel speed sensor 8 when the gravitational acceleration component of the centrifugal acceleration of the TPMS sensor 2 with a specific identification information has reached a predetermined value.

Therefore, the sampling period may be set appropriately, and both the suppression of power consumption and the enhancement of the detection accuracy in the gravitational acceleration component may be achieved.

The sensor control unit 2c is configured to set the sampling period shorter as the centrifugal acceleration is greater. Therefore, when the wheel speed is low, the power consumption may be suppressed by lengthening the sampling period and, when the wheel speed is high, the detection accuracy in the gravitational acceleration component will be enhanced by shortening the sampling period.

The sensor control unit 2c is configured to stop detection of the value of the gravitational acceleration component of the centrifugal acceleration when the centrifugal acceleration detected by the acceleration sensor 2b is a predetermined acceleration or more. Therefore, when a failure occurs with the acceleration sensor 2b, increase in the power consumption due to the sampling period being set shorter.

In the first embodiment, the sampling period is set shorter as the centrifugal acceleration detected by the acceleration sensor 2b is greater. In contrast, in the second embodiment, a shock sensor 21 is used to detect the rotation period of the wheel 1, and is configured to set the sampling period shorter as the rotation period is shorter.

Description is now made of the second embodiment below. Note that the same configurations as the first embodiment, the same reference numbers are given and description therefore is omitted.

Figure 13:
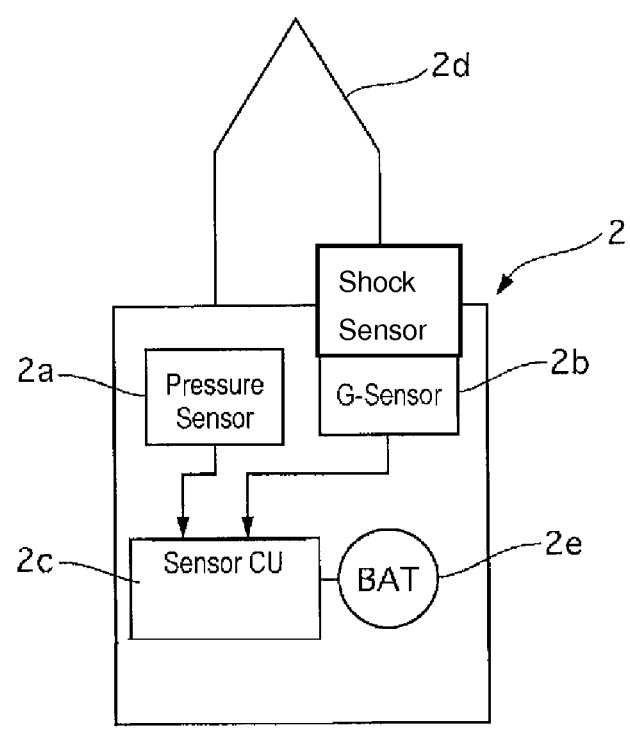
FIG. 13 is a configuration diagram of a TPMS sensor in a second embodiment.

As shown in FIG. 2, the TPMS sensor 2 is installed on each wheel 1, and more specifically mounted at the position of an air valve of the tire on the outer periphery of the wheel 1. FIG. 13 is a configuration diagram of the TPMS sensor 2. The TPMS sensor 2 is provided with a pressure sensor 2a, a shock sensor 21, a sensor control unit 2c, a transmitter 2d, and a button battery.

The pressure sensor 2a detects a tire air pressure. The shock sensor 2f detect a change in load acting on the TPMS sensor when the tire surface of the position at which the TPMS sensor is installed contact a road surface. The sensor control unit 2c operates by the power supplied from the button battery 2e, and receives tire air pressure information from the pressure sensor 2a and load information from the shock sensor 2f. In addition, the TPMS data containing the air pressure information of the tire and a sensor ID (the identification information) that is previously set and unique to each TPMS sensor 2 is sent in a wireless signal from the transmitter 2d. In the second embodiment, the sensor IDs are defined by 1 to 4 associated with each of the TPMS sensors 2.

The sensor control unit 2c compares the amount of change in the load detected by the shock sensor 21 with a preset threshold for determination of a vehicle running state. When the amount of change in load is less than the running determination threshold, a determination is made that the vehicle is being stopped or stationary, so that transmission of the TPMS data is stopped. On the other hand, when the amount of change in load exceeds the running determination threshold, a determination is made that the vehicle is running, and the TPMS data will be transmitted at a prescribed time When the vehicle stop determination time is equal to or greater than 15 minutes, the TPMS sensor 2 determines that the tire rotation may have been carried out. When the vehicle stop determination time is less than 15 minutes, it is determined that no updating of the memory 4d is required and a "fixed time transmission mode" is selected. When the vehicle stop determination time is equal to or greater than 15 minutes, it is determined that updating of the memory 4d is necessary and a "fixed position transmission mode" will be selected.

Note that the outlines of the "fixed time transmission mode", and the "fixed position transmission mode" is the same as the first embodiment. Thus the descriptions are omitted here. Primarily, description is made of the "fixed position detection control" to be executed during the "fixed position transmission mode" and the "sampling period variable control".

The sensor control unit 2c transmits, as described above, TPMS data when the TPMS sensor 2 has reached a fixed rotational position (for example, when the tire surface contacts the road surface). The shock sensor 2f detects that the TPMS sensor 2 has reached a predetermined fixed rotational position through the shock sensor 2f. The shock sensor 21 assumes its peak in load when the rotational position of the TPMS sensor reaches a position at which the tire surface contacts a road surface. By outputting the TPMS data at this position, the TPMS sensor 2 may output the TPMS data at a constant rotational position.

Figure 14:
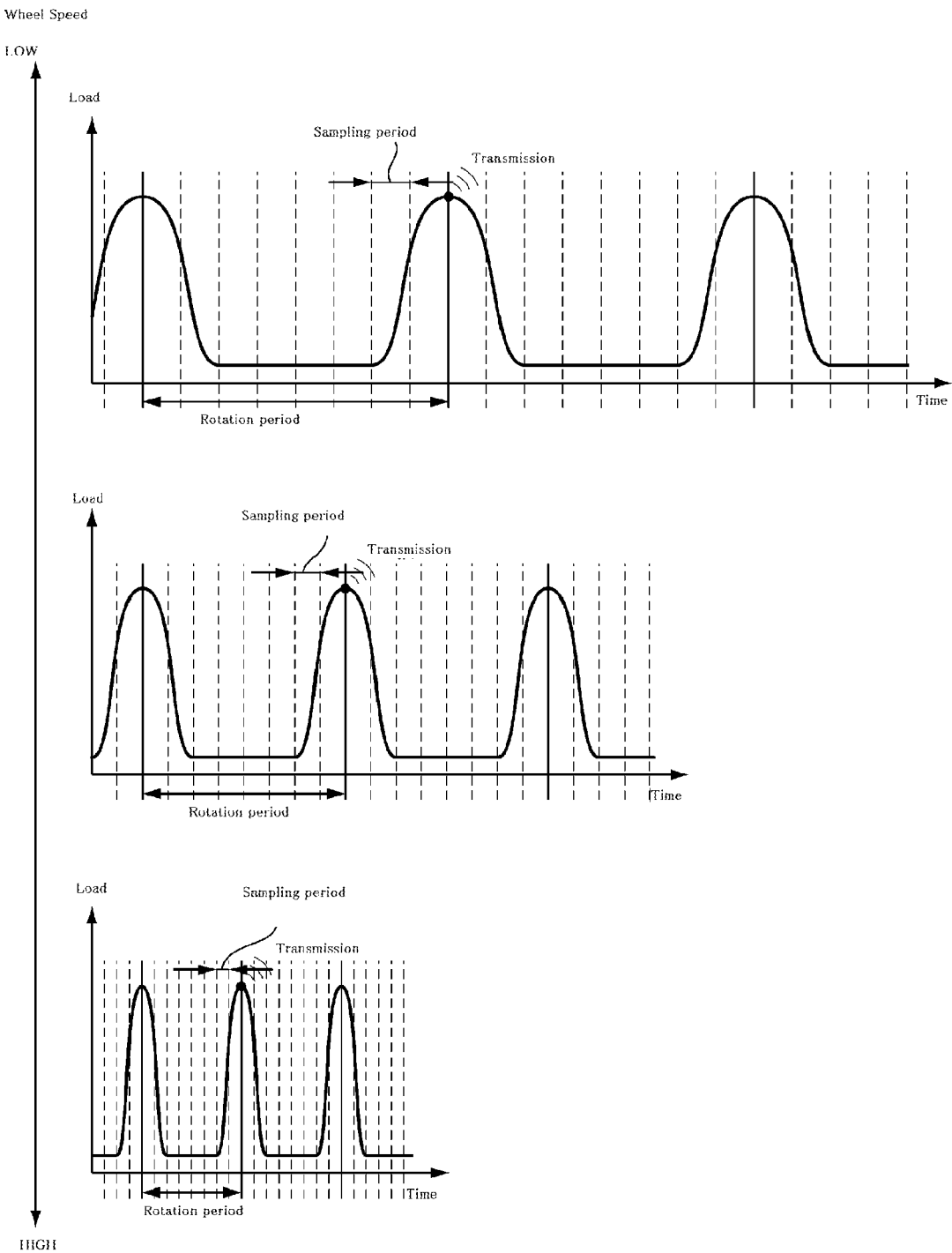
FIG. 14 is a graph showing changes in load and wheel speed in the second embodiment.

FIG. 14 is a diagram showing change in load in accordance with the wheel speed. In FIG. 14, the wheel speed is depicted to change from a low value to a high value when advancing from top to bottom of the figure. As shown in FIG. 14, since the rotation period of the wheel 1 becomes shorter as the wheel speed increases, the period of the load change frequency will be higher.

Although the sensor control unit 2c monitors the value of the load at each prescribed sampling rate or period, in order to enhance the detection accuracy of the peak of the load, it is necessary to secure a certain number of sampling within one cycle or period of the load change. On the other hand, increase in the number of samplings will lead to a greater power consumption so that the long life of the button battery 2e would not be ensured.

Stated in another way, it is necessary to suppress the power consumption by lengthening the sampling period when the wheel speed is low. Further, it is necessary to increase the detection accuracy of the gravitational acceleration component by shortening the sampling period when the wheel speed is high.

Figure 15:
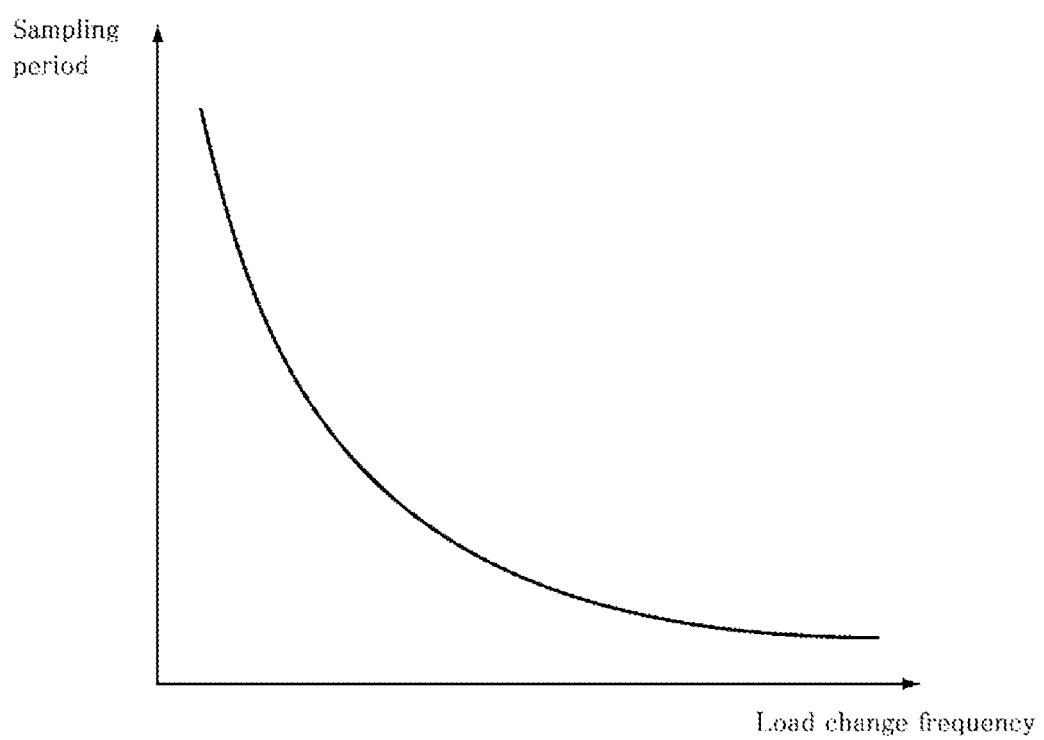
FIG. 15 is a diagram illustrating a sampling period in accordance with the load change frequency in the second embodiment.

FIG. 15 is a diagram for setting the sampling period corresponding to the load change frequency detected by the shock sensor 2f. The shock sensor 2f detects the load change frequency higher as the wheel speed (rotation frequency of wheel 1) is higher.

Thus, as shown in FIG. 15, by setting the sampling period shorter as the load change frequency is higher, an appropriate setting of the sampling period is possible and both the suppression in power consumption and the detection accuracy in the gravitational acceleration component will be improved.

Further, when the detected load value of the shock sensor 21 exceeds a predetermined load, monitoring of the load peak will be stopped. The predetermined load is set to such a load that would not occur during the vehicle travel, and when the detected load value of the shock sensor 2f exceeds the predetermined value, it is configured such that the determination of occurrence of abnormal fixation of the shock sensor 2f or the like may be made.

This is intended to prevent the power consumption from being increased with the sampling period being set to a shorter value when abnormality occurs in the shock sensor 2f. In the TPMS sensor 2 according to the second embodiment, following effects may be exhibited.

In a TPMS sensor 2 (tire air pressure transmission device) installed on the outer periphery of a wheel 1 to transmit a tire air pressure information of the wheel 1, provided are a shock sensor 2f (rotation frequency detection mechanism) that detects a rotation frequency of the wheel 1; a sensor control unit 2c (rotational position detection mechanism) that sets a sampling period based on the rotation frequency and detects the rotational position of the wheel at each set sampling period, and a transmitter 2d (transmission mechanism) that transmits the tire air pressure information in a wireless signal when the rotational position of the wheel has reached a predetermined position. Therefore, the sampling period may be set appropriately, and both the suppression of power consumption and the enhancement of the detection accuracy in the gravitational acceleration component may be achieved.

The sensor control unit 2c is configured to set the sampling period shorter as the rotation frequency of the wheel 1 is higher. Therefore, when the wheel speed is low, the power consumption may be suppressed by lengthening the sampling period while when the wheel speed is high the detection accuracy in the gravitational acceleration component may be enhanced by shortening the sampling period.

The sensor control unit 2c is configured to stop detection of the detection of the rotation frequency of the wheel when the value of the centrifugal direction load detected by the shock sensor 2f exceeds a predetermined load. Therefore, when a failure occurs with the shock sensor 2f, increase in the power consumption due to the sampling period being set shorter.

In addition, in the tire air pressure monitoring system 13 in the second embodiment, the following effects may be achieved;

In a tire air pressure monitoring system 13 with a TPMS sensor 2 (tire air pressure transmission unit) installed on the outer periphery of a wheel 1 to transmit a tire air pressure information of the wheel 1 via a wireless signal and a TPMS main part 14 (tire air pressure monitoring main part) installed on a vehicle body for receiving the wireless signal and monitoring the tire air pressure of each wheel, the TPMS sensor 2 is provided with a pressure sensor 2a (tire air pressure detection mechanism) that detects the tire air pressure, a shock sensor 2f (rotation frequency detection mechanism) that detects a rotation frequency of the wheel 1; a sensor control unit 2c (rotational position detection mechanism) that sets a sampling period based on the rotation frequency and detects the rotational position of the wheel 1 at each set sampling period, and a transmitter 2d (transmitting mechanism) that transmits the tire air pressure information in a wireless signal, wherein the TPMS main part 14 is provided with a receiver 3 (receiving mechanism) that receives the tire air pressure information transmitted from the transmitter 2d of each TPMS sensor 2, an ABS control unit 6 (rotational position detection mechanism) that detects the rotational position of each wheel 1, and a TPMS control unit 4 (wheel position determination mechanism) that determines the wheel position to which the TPMS sensor 2 is installed based on the rotational position of each wheel detected by the wheel speed sensor 8 when the gravitational acceleration component of the centrifugal acceleration of the TPMS sensor 2 with a specific identification information has reached a predetermined value.

Therefore, the sampling period may be set appropriately, and both the suppression of power consumption and the enhancement of the detection accuracy in the gravitational acceleration component may be achieved.

The sensor control unit 2c is configured to set the sampling period shorter as the rotation frequency of the wheel 1 is higher. Therefore, when the wheel speed is low, the power consumption may be suppressed by lengthening the sampling period, and when the wheel speed is high, the detection accuracy of the gravitational acceleration component will be enhanced.

The sensor control unit 2c is configured to stop detection of the value of the rotation frequency when the centrifugal acceleration detected by the shock sensor 2f is a predetermined load or more. Therefore, when a failure occurs with the acceleration sensor 2b, increase in the power consumption due to the sampling period being set shorter.

Although the gravitational acceleration component is constantly monitored in the first embodiment, in a third embodiment an intermittent monitoring is carried out.

Description is now made of the third embodiment, since the configurations other than the "Control of TPMS sensor" are the same, the same reference numbers are attached and corresponding explanations are omitted.

The TPMS sensor 2 determines that the tire rotation may have been carried out when the vehicle stop determination time is equal to or greater than 15 minutes.

When the vehicle stop determination time is less than 15 [min.], determination is made that updating of the memory 4d is not required and the "fixed time transmission mode" is selected. When the vehicle stop determination time is 15 [min.] or more, updating of the memory 4d is determined to be carried out and the "fixed position transmission mode" will be selected.

Note that, since the outlines of the "fixed time transmission mode" as well as the "fixed position transmission mode" are the same as the first embodiment, the explanation thereof are omitted. Below, primary description is made of a "partial monitoring control", "sampling period variable control", and "gravitational acceleration component monitoring control process" is made.

Although the sensor control unit 2c is monitoring the value of the gravitational acceleration component at each predetermined sampling period or cycle, in order to improve the detection accuracy of the peak of the gravitational acceleration component, the sampling period is required to be shortened.

On the other hand, since the power consumption is increased with the sampling period being shorter, a long life of the button battery 2e may not be expected.

Figure 16:
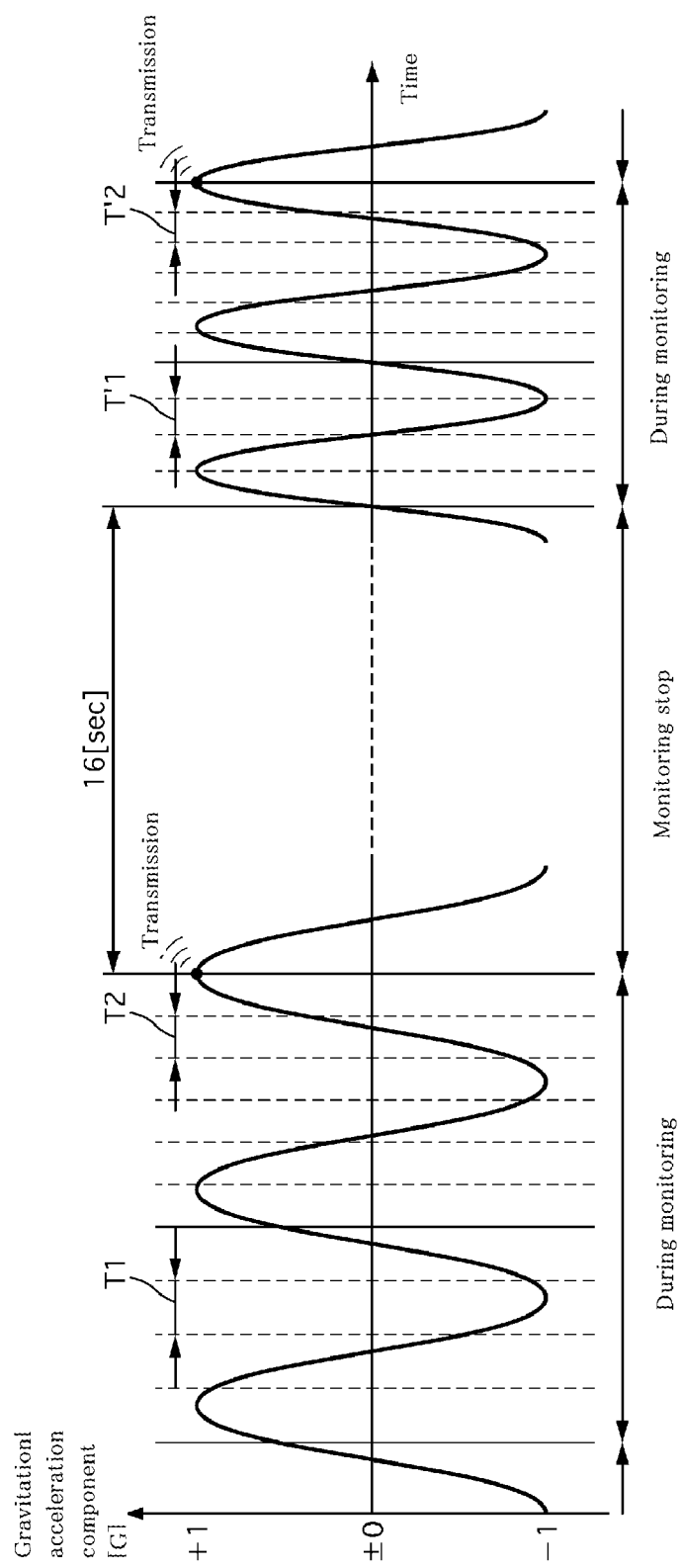
FIG. 16 is a diagram illustrating a monitoring state of gravitational acceleration component in a third embodiment.

FIG. 16 is a diagram illustrating a monitoring status of the gravitational acceleration component. As shown in FIG. 16, in the sensor control unit 2c, monitoring of the value of the gravitational acceleration component is carried out only 16 sec. after the transmission of the previous TPMS. Thus, during the 16 sec. of elapsed time following the transmission of the TPMS data, monitoring of the gravitational acceleration component is stopped.

Therefore, since the value of the gravitational acceleration component is monitored immediately before the transmission of the TPMS data, number of sampling will be maintained small as a whole even if a shorter sampling period is to be used. Thus, the detection accuracy of the peak of the gravitational acceleration component will be increased and the power consumption may be suppressed.

FIG. 17 is a diagram showing changes in the gravitational acceleration component in accordance with the wheel speed. In FIG. 17, the wheel speed is depicted to change from a low value to a high value when advancing from top to bottom of the figure. As shown in FIG. 17, since the rotation period of the wheel 1 becomes shorter as the wheel speed increases, the period of the gravitational acceleration will be likewise shorter.

In order to enhance the detection accuracy of the peak of the gravitational acceleration component, it is necessary to secure a certain number of samples within one cycle or period of the gravitational acceleration component. On the other hand, an increase in the number of samplings will lead to larger power consumption so that the long life of the button battery 2e would not be ensured.

Stated in another way, it is necessary to suppress the power consumption by lengthening the sampling period when the wheel speed is low. Further, it is necessary to increase the detection accuracy of the gravitational acceleration component by shortening the sampling period when the wheel speed is high.

Figure 18:
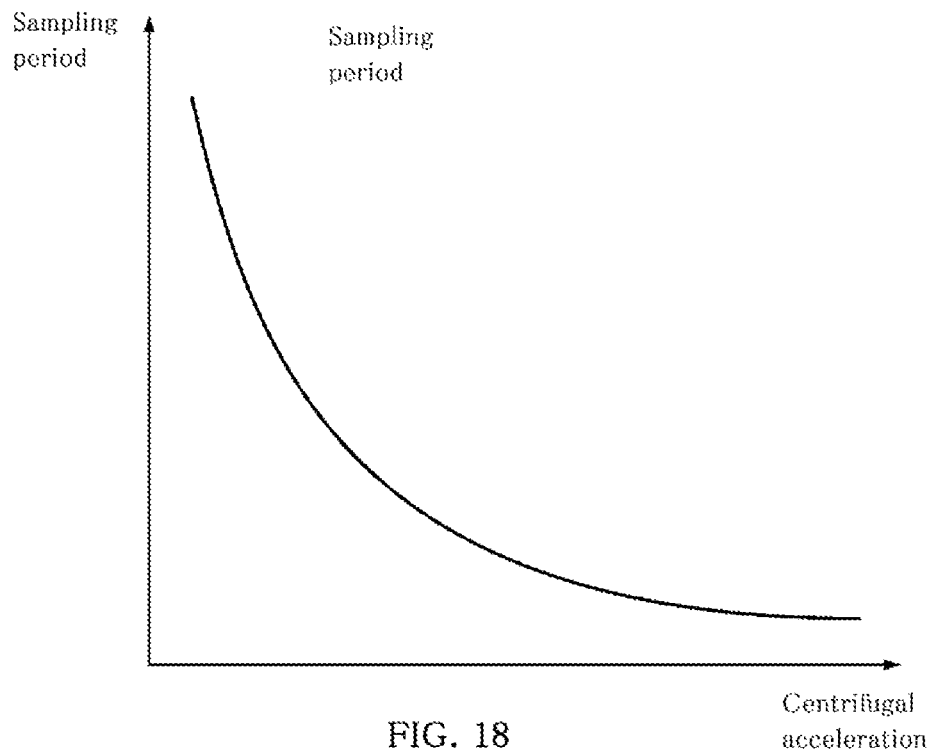
FIG. 18 is a diagram illustrating a sampling period in accordance with a centrifugal acceleration in the third embodiment.

FIG. 18 is a diagram for setting the sampling cycle corresponding to the magnitude of the centrifugal force component. As mentioned above, the centrifugal force component varies so as to follow the wheel speed shown in FIG. 4 (a) as a whole centrifugal force component as shown in FIG. 4(d). Therefore, as shown in FIG. 18, by setting the sampling period shorter as the centrifugal force component is larger, it is possible to properly set the sampling period and improvement in the detection accuracy of the gravitational acceleration component as well as suppressing of power consumption may be achieved.

Figure 19:
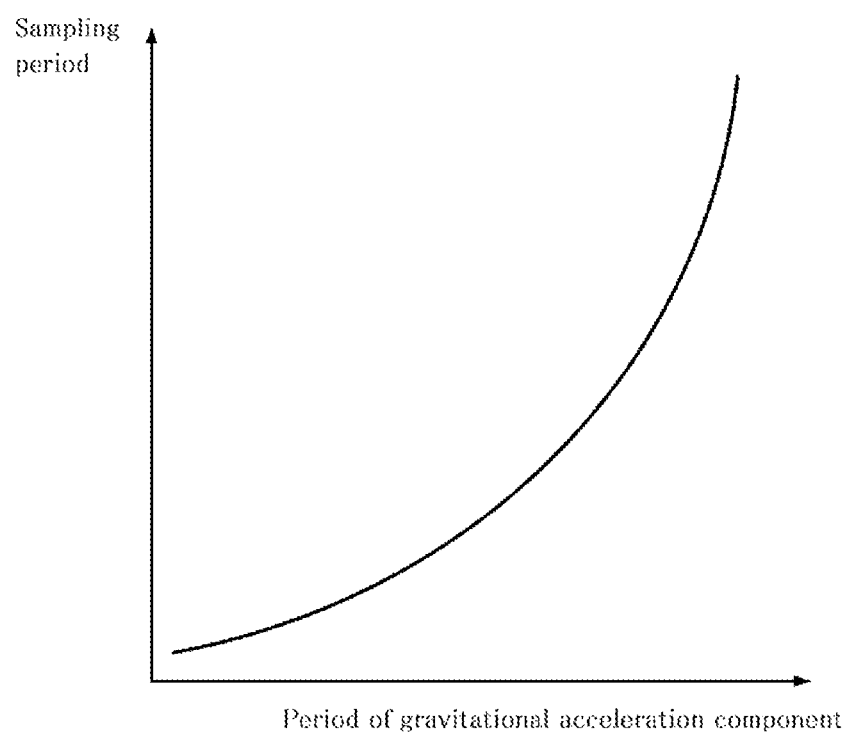
FIG. 19 is a diagram illustrating a sampling period in accordance with a gravitational acceleration component in the third embodiment.

Further, the sensor control unit 2c is capable of determining the period of the gravitational acceleration component based on the gravitational acceleration component monitored at the sampling period which is set based on the magnitude of the centrifugal force component, FIG. 19 is a diagram for setting the sampling period or cycle in accordance with the period of the gravitational acceleration component. By setting the sampling period longer as the period of the gravitational acceleration component is longer, as shown in FIG. 19, it is possible to properly set the sampling period so as to improve the detection accuracy of the gravitational acceleration component and suppress the power consumption.

As shown in FIG. 16, in the first cycle immediately after the sensor control unit 2c has started monitoring, monitoring is performed at a sampling period T1, T'1 set in accordance with the centrifugal force component. Further, in the second and subsequent cycles following the first cycle or period, monitoring is performed at a sampling period T2, T'2 set in accordance with the period of the gravitational acceleration component acquired in the first cycle.

Figure 20:
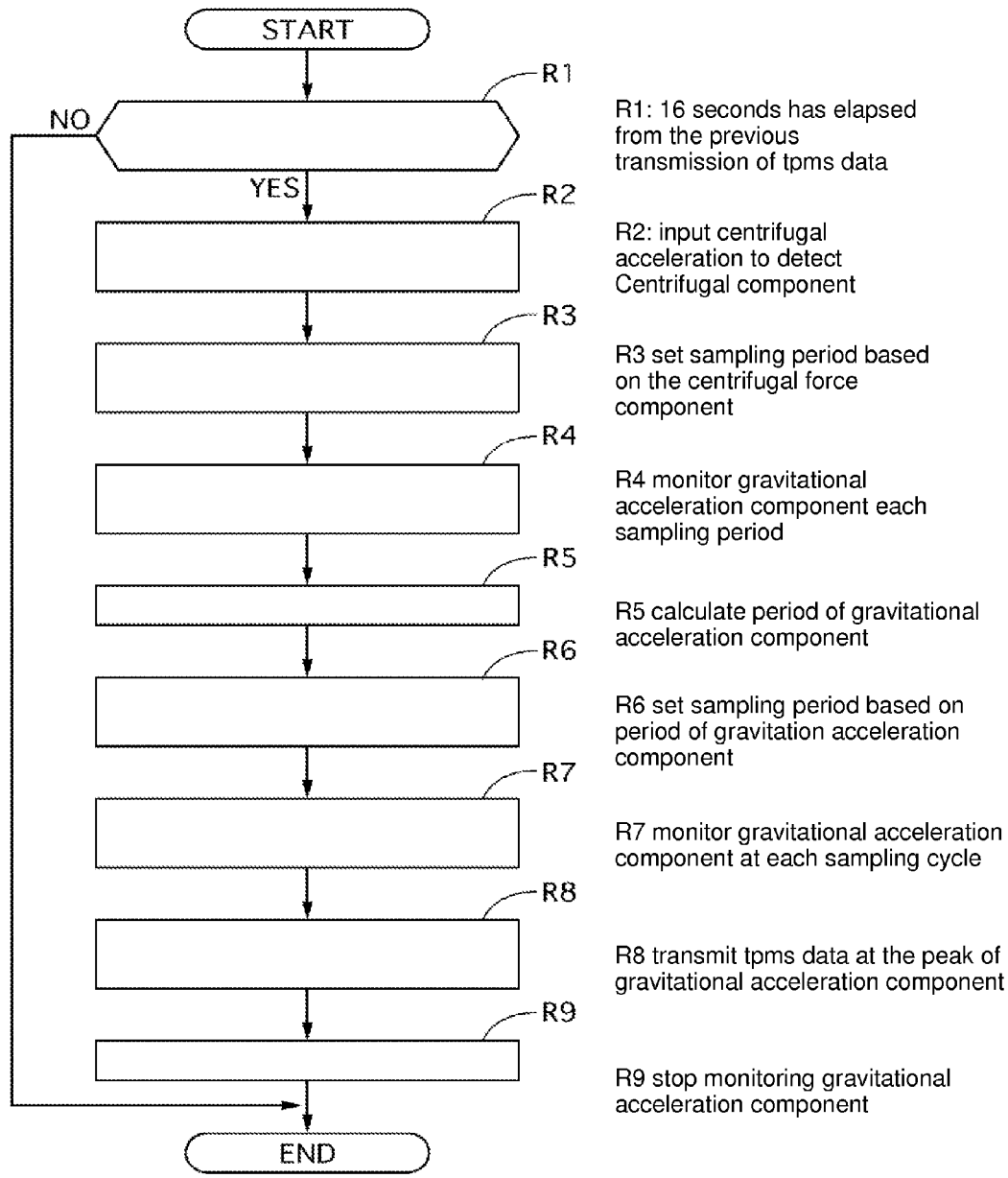
FIG. 20 is a flowchart illustrating a flow of monitoring control process of the gravitational acceleration component in the third embodiment.

FIG. 20 is a flowchart showing the flow of monitoring control process of the gravitational acceleration component performed in the sensor control unit 2c. In the following, description is made of each step.

In step R1, it is determined whether or not 16 sec. has elapsed after the transmission of the TPMS data. The process proceeds to step R2 in the case of YES, and terminates the process in the case of NO.

In step R2, the centrifugal acceleration is received from the acceleration sensor 2b to determine the magnitude of the centrifugal force component.

In step R3, the sampling period is set based on the magnitude of the centrifugal force component.

In step R4, the gravitational acceleration component is monitored at each sampling period set in step R3. In step R5, the period of the gravitational acceleration component is obtained from the monitoring results of the gravitational acceleration component. In step R6, the sampling period is set from the period of the gravitational acceleration component.

In step R7, the gravitational acceleration component is monitored at each sampling period set in step R6. In step R8, the TPMS data is sent at the peak of gravitational acceleration component. In step R9, monitoring of the gravitational acceleration component is stopped, and the process ends.

Although the sensor control unit 2c is monitoring the value of the gravitational acceleration component at each predetermined sampling cycle, in order to enhance the detection accuracy of the peak of the gravitational acceleration component, it is necessary to shorten the sampling period. Meanwhile, since the power consumption is increased as the sampling period becomes shorter, long life of the button battery 2e cannot be expected Thus, in the tire pressure monitoring system 13 of the first embodiment, in the sensor control unit 2c, the value of the gravitational acceleration component is monitored only after 16 seconds of elapsed time after transmission of a previous TPMS data and the monitoring during the 16 seconds of time after the transmission of the TPMS data, monitoring of the value of the gravitational acceleration component is stopped.

Therefore, since the value of the gravitational acceleration component is monitored immediately before the transmission of the TPMS data only, the number of samples may be maintained small as a whole in spite of the shortened sampling period. Consequently, it is possible to enhance the detection accuracy of the gravitational acceleration component and suppress the power consumption.

In order to enhance the detection accuracy of the peak of the gravitational acceleration component, it is necessary to secure a certain number of samples within one cycle or period of the gravitational acceleration component. On the other hand, an increase in the number of samplings will lead to larger power consumption so that the long life of the button battery 2e would not be ensured.

Therefore, in the tire pressure monitoring system 13 of the first embodiment, the sensor control unit 2c is configured to set the sampling period shorter as the centrifugal force component is larger.

Thus, the sampling period may be appropriately set so as to suppress the power consumption and enhance the detection accuracy in the gravitational acceleration component.

Furthermore, the sensor control unit 2c acquires the period of the gravitational acceleration component based on the gravitational acceleration component monitored in accordance with a sampling period set based on the centrifugal force component and sets the sampling period shorter as the period of the gravitational acceleration component is shorter.

Therefore, in order to acquire the sampling period that may ensure the detection accuracy of the peak in the gravitational acceleration component, by using the period of the gravitational acceleration component directly affected, it is possible to set a more suitable sampling period so that the suppression of power consumption as well as increase in the detection accuracy in the gravitational acceleration component may be achieved.

In the TPMS sensor 2 according to the third embodiment, following effects may be exhibited.

In a TPMS sensor 2 (tire air pressure transmission device) installed on the outer periphery of a wheel 1 to transmit a tire air pressure information of the wheel 1, provided are an acceleration sensor 2b (acceleration detecting mechanism) that detects a centrifugal acceleration while the wheel 1 rotates; a transmitter 2d (transmitting mechanism) that transmits the tire air pressure information in a wireless signal when the value of the gravitational acceleration component of the centrifugal acceleration has reached a predetermined value; and a sensor control unit 2c (gravitational acceleration component detection mechanism) that starts to detect the gravitational acceleration component of the centrifugal acceleration before the transmission of the wireless signal from the transmitter 2d and stops the detection of the value of the gravitational acceleration component of the centrifugal acceleration after the transmission of the wireless signal from the transmitter 2d.

Therefore, since the value of the gravitational acceleration component is monitored immediately before the TPMS data transmission only, the number of samplings may be maintained small despite shortening the sampling period so that the detection accuracy in the peak of the gravitational acceleration component as well as the suppression of power consumption may be achieved.

The sensor control unit 2c is configured to set the sampling period shorter as the centrifugal force component of the centrifugal acceleration is greater.

Therefore, when the wheel speed is low, the power consumption may be suppressed by lengthening the sampling period and, when the wheel speed is high, the detection accuracy in the gravitational acceleration component will be enhanced by shortening the sampling period.

After starting the detection of the value of the gravitational acceleration component of the centrifugal acceleration, the sensor control unit 2c detects the gravitational acceleration component at each sampling period set shorter as the centrifugal force component of the centrifugal acceleration is larger in the first period or cycle of the gravitational acceleration component, and, in the second and subsequent cycles, the gravitational acceleration component is detected at each sampling period set shorter as the period of the gravitational acceleration component detected in the first period is shorter.

Therefore, in order to acquire the sampling period that may secure the detection accuracy in the peak of the gravitational acceleration component, by using the period of the gravitational acceleration component directly affected, it is possible to set a more appropriate sampling period so that the suppression in power consumption and the detection accuracy in the gravitational acceleration component may be achieved.

In addition, in the tire air pressure monitoring system 13 in the second embodiment, the following effects may be achieved;

In a tire air pressure monitoring system 13 with a TPMS sensor 2 (tire air pressure transmission unit) installed on the outer periphery of each wheel 1 to transmit a tire air pressure information of the wheel 1 via a wireless signal and a TPMS main part 14 (tire air pressure monitoring main part) installed on a vehicle body for receiving the wireless signal and monitoring the tire air pressure of each wheel 1, the TPMS sensor 2 is provided with a pressure sensor 2a (tire air pressure detection mechanism) that detects the tire air pressure, an acceleration sensor (acceleration detection mechanism) that detects a centrifugal acceleration while the wheel 1 is rotating, and a transmitter (transmitting unit) that transmits the tire air pressure information in a wireless signal when the value of the gravitational acceleration component of the centrifugal acceleration has reached a predetermined value, and a sensor control unit 2c (gravitational acceleration component detection mechanism) that detects a gravitational acceleration component of the centrifugal acceleration at each set sampling period, starts to detect the gravitational acceleration component of the centrifugal acceleration before the transmission of the wireless signal from the transmitter 2d, and stops to detect the gravitational acceleration component of the centrifugal acceleration after the transmission of the wireless signal from the transmitter 2d, wherein the TPMS main part 14 is provided with a receiver 3 (receiving mechanism) that receives the tire air pressure information transmitted from the transmitter 2d of each TPMS sensor 2, an ABS control unit 6 (rotational position detection mechanism) that detects the rotational position of each wheel 1, and a TPMS control unit 4 (wheel position determination mechanism) that determines the wheel position to which the TPMS sensor 2 is installed based on the rotational position of each wheel detected by the wheel speed sensor 8 when the gravitational acceleration component of the centrifugal acceleration of the TPMS sensor 2 with a specific identification information has reached a predetermined value.

Therefore, since the gravitational acceleration component is monitored only immediately prior the sampling period may be set appropriately, and both the suppression of power consumption and the enhancement of the detection accuracy in the gravitational acceleration component may be achieved.

The sensor control unit 2c is configured to set the sampling period shorter as the centrifugal force component of the centrifugal acceleration is larger.

Therefore, the power consumption may be suppressed when the wheel speed is low by lengthening the sampling period while the detection accuracy of the gravitational acceleration component will be enhanced when the wheel speed is high by shortening the sampling period.

The sensor control unit 2c is configured to detect, after detection of the value of the gravitational acceleration component of the centrifugal acceleration, the gravitational acceleration component at each sampling period set shorter as the centrifugal force component of the centrifugal acceleration during the first period of the gravitational acceleration component, and, in the second and subsequent periods, detect the gravitational acceleration component at each sampling period set shorter as the period of the gravitational acceleration component detected in the first period is shorter.

Therefore, in order to acquire the sampling period that may ensure the detection accuracy of the peak in the gravitational acceleration component, by using the period of the gravitational acceleration component directly affected, it is possible to set a more suitable sampling period so that the suppression of power consumption as well as increase in the detection accuracy in the gravitational acceleration component may be achieved.

While best embodiments have been described to implement the present invention, the specific configuration is not limited to these embodiments. Rather, the design change or alterations that do not depart the essence of the present invention may be included in the present invention.

For example, an example of the wheel speed sensor is shown as the rotational position detection mechanism in the embodiments, in a vehicle which is provided with an in-wheel motor as power source, a resolver of the motor may be used to detect the rotational angle.

The invention claimed is:

1. A tire air pressure transmission device installed on a wheel comprising:
   a tire air pressure detection mechanism that detects a tire air pressure of the wheel;
   an acceleration detection mechanism that detects a centrifugal acceleration while the wheel rotates;
   a gravitational acceleration component detection mechanism that sets sampling periods based on the centrifugal acceleration and detects a value of a gravitational acceleration component of the centrifugal acceleration at each sampling period, wherein
   a detected tire air pressure information is transmitted in a wireless signal when the gravitational acceleration component of the centrifugal acceleration has reached a predetermined value.

2. The tire air pressure transmission device as claimed in claim 1, wherein the gravitational acceleration component detection mechanism is configured to set the sampling period shorter as the centrifugal acceleration is greater.

3. The tire air pressure transmission device as claimed in claim 1, wherein the gravitational acceleration component detection mechanism is configured to stop detection of the value of the gravitational acceleration component when the centrifugal acceleration detected by the acceleration detection mechanism is a predetermined acceleration or more.

4. A tire air pressure monitoring system for monitoring a tire air pressure of each wheel comprising:
   a tire air pressure detection mechanism installed on the tire of each wheel to detect the tire air pressure;
   an acceleration detection mechanism installed on each wheel to detect a centrifugal acceleration while the wheel is rotating;
   a gravitational acceleration component detection mechanism that sets sampling periods based on the centrifugal acceleration and detects a value of a gravitational acceleration component of the centrifugal acceleration at each sampling period;
   a transmitter that transmits detected tire air pressure information in a wireless signal with identification information unique to each transmitter when the value of the gravitational acceleration component has reached a predetermined value;
   a receiver installed on a vehicle body to receive the wireless signal;
   a rotational position detection mechanism installed on the vehicle body corresponding to each wheel to detect a rotational position of each wheel, and
   a wheel position determination mechanism that determines the position of the wheel to which the transmitter is installed based on the rotational position of each wheel at the time when the wireless signal including the identification information is transmitted.

5. The tire air pressure monitoring system as claimed in claim 4, wherein the gravitational acceleration component detection mechanism is configured to set the sampling periods shorter as the centrifugal acceleration is greater.

6. The tire air pressure monitoring system as claimed in claim 4, wherein the gravitational acceleration component detection mechanism is configured to stop detection of the value of the gravitational acceleration component when the centrifugal acceleration detected by the acceleration detection mechanism is a predetermined acceleration or more.

7. A tire air pressure transmission device installed on a wheel, comprising:
- a tire air pressure detection mechanism that detects a tire air pressure of the wheel;
- a rotation frequency detection mechanism that detects a rotation frequency of the wheel;
- a rotational position detection mechanism on the wheel that sets sampling periods based on the rotation frequency and detects a rotational position of the wheel at each sampling period, wherein
- detected tire air pressure information is transmitted in a wireless signal when the rotational position of the wheel assumes a predetermined position.

8. The tire air pressure transmission device as claimed in claim 7, wherein the rotational position detection mechanism on the wheel is configured to set the sampling periods shorter as the rotation frequency of the wheel is higher.

9. The tire air pressure transmission device as claimed in claim 7, wherein the rotational frequency detection mechanism is configured as a shock sensor to detect a load acting on the tire, and the rotational position detection mechanism is configured to stop detection of the rotational position of the wheel when the load detected by the shock sensor is equal to or greater than a predetermined load.

10. A tire air pressure monitoring system for monitoring an air pressure of each tire comprising:
- a tire air pressure detection mechanism installed on a tire of each wheel that detects tire air pressure;
- a rotation frequency detection mechanism installed on each wheel that detects a rotation frequency of the wheel;
- a rotational position detection mechanism on each wheel that sets sampling periods based on the rotation frequency and detects a rotational position of the wheel at each set sampling period;
- a transmitter that transmits a wireless signal of detected tire air pressure information with identification information unique to each transmission;
- a receiver installed on a vehicle body to receive the wireless signal;
- a rotational position detection mechanism installed on the vehicle body in correspondence with each wheel that detects the rotational position of each wheel; and
- a wheel position determination mechanism that determines a position of the wheel to which the transmitter is installed based on the rotational position of each wheel detected by the rotational position detection mechanism when the wireless signal containing the identification information has been transmitted.

11. The tire air pressure monitoring system as claimed in claim 10, wherein the rotational position detection mechanism is configured to set the sampling periods shorter as the rotation frequency of the wheel is higher.

12. The tire air pressure monitoring system as claimed in claim 10, wherein the rotation frequency detection mechanism is a shock sensor that detects a load acting on the tire, and the rotational position detection mechanism is configured to stop detection of the rotational position of the wheel when the load detected by the shock sensor is equal to or greater than a predetermined load.

13. A tire air pressure transmission device installed on a wheel comprising:
- a tire air pressure detection mechanism that detects a tire air pressure of the wheel;
- an acceleration detection mechanism that detects a centrifugal acceleration while the wheel is rotating;
- a gravitational acceleration detection mechanism that detects a value of a gravitational acceleration component of the centrifugal acceleration by detecting the gravitational acceleration component at each first sampling period set based on the centrifugal acceleration during a first period of the gravitational acceleration component, and
- in second and subsequent periods following the first period, by detecting the gravitational acceleration component at each second sampling period set based on the gravitational acceleration component detected in the first period, and, after transmission of the wireless signal, stopping to detect the value of the gravitational acceleration component, wherein, when the value of the gravitational acceleration component of the centrifugal acceleration has reached a predetermined value, the detected tire air pressure information is transmitted in a wireless signal.

14. The tire air pressure transmission device as claimed in claim 13, wherein the gravitational acceleration detection mechanism is configured to set the first sampling period shorter as a centrifugal force component of the centrifugal acceleration is larger.

15. The tire air pressure transmission device as claimed in claim 13, wherein the gravitational acceleration detection mechanism is configured to set the sampling period, shorter as the period of the gravitational acceleration component detected in the first period is shorter.

16. A tire air pressure monitoring system for monitoring an air pressure of each tire comprising:
- a tire air pressure detection mechanism installed on a tire of each wheel that detects a tire air pressure;
- an acceleration detection mechanism installed on each wheel that detects a centrifugal acceleration while the wheel is rotating;
- a gravitational acceleration detection mechanism that detects a value of the gravitational acceleration component of the centrifugal acceleration by detecting a gravitational acceleration component at each first sampling period set based on the centrifugal acceleration during a first period of gravitational acceleration component whereas, in the second and subsequent periods following the first period, by detecting the gravitational acceleration component at each second sampling period set based on the gravitational acceleration component detected in the first period, and, after transmission of the wireless signal, stopping to detect the value of the gravitational acceleration component, wherein, when the value of the gravitational acceleration component of the centrifugal acceleration has reached a predetermined value; and
- a transmitter that transmits a wireless signal of the detected tire air pressure information with identification information unique to each transmission when the value of the gravitational acceleration component of the centrifugal acceleration has reached a predetermined value.

17. The tire air pressure monitoring system as claimed in claim 16, wherein the gravitational acceleration detection mechanism is configured to set the first sampling period shorter as a centrifugal force component of the centrifugal acceleration is larger.

18. The tire air pressure monitoring system as claimed in claim 16 or 17, wherein the gravitational acceleration detection mechanism is configured to set the sample period shorter as the period of the gravitational acceleration component detected in the first period is shorter.

* * * * *